US007240758B2

(12) United States Patent
Korenjak et al.

(10) Patent No.: US 7,240,758 B2
(45) Date of Patent: Jul. 10, 2007

(54) COMPONENT ARRANGEMENT FOR AN ALL TERRAIN VEHICLE

(75) Inventors: Norbert Korenjak, Stadl-Paura (AT); Wilfried Ehlers, Wels (AT); Johann Holzleitner, Gunskirchen (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 11/020,253

(22) Filed: Dec. 27, 2004

(65) Prior Publication Data

US 2005/0103553 A1 May 19, 2005

Related U.S. Application Data

(63) Continuation of application No. 09/943,737, filed on Sep. 4, 2001, now Pat. No. 6,896,087.

(60) Provisional application No. 60/316,027, filed on Aug. 31, 2001, provisional application No. 60/263,501, filed on Jan. 24, 2001, provisional application No. 60/229,338, filed on Sep. 1, 2000.

(51) Int. Cl.
*B60K 5/02* (2006.01)

(52) U.S. Cl. .................. 180/292; 180/297; 180/374; 180/376; 474/13; 74/665 GC; 74/665 GE

(58) Field of Classification Search ............. 180/292, 180/291, 297, 374, 375, 376, 230, 231, 233, 180/315, 332, 65.4; 474/8, 11, 12, 15, 13, 474/17, 84, 86, 87; 74/650, 665 GC, 665 GE, 74/665 H, 665 T, 325
See application file for complete search history.

(56) References Cited

U.S. PATENT DOCUMENTS

| | | | | |
|---|---|---|---|---|
| 4,372,415 A | * | 2/1983 | Watanabe et al. | 180/215 |
| 4,529,055 A | * | 7/1985 | Gotoh et al. | 180/210 |
| 4,531,928 A | * | 7/1985 | Ikenoya | 474/93 |
| 4,666,015 A | * | 5/1987 | Matsuda et al. | 180/233 |
| 4,697,665 A | * | 10/1987 | Eastman et al. | 180/230 |
| 4,714,126 A | * | 12/1987 | Shinozaki et al. | 180/233 |
| 4,722,235 A | * | 2/1988 | Kumazawa | 74/15.66 |
| 4,798,254 A | * | 1/1989 | Lings | 180/58 |
| 5,152,361 A | * | 10/1992 | Hasegawa et al. | 180/230 |

(Continued)

FOREIGN PATENT DOCUMENTS

EP          0578267    *  11/1988    ............. 180/292

(Continued)

*Primary Examiner*—Christopher P. Ellis
*Assistant Examiner*—Jhon Walters
(74) *Attorney, Agent, or Firm*—Osler, Hoskin & Harcourt LLP

(57) ABSTRACT

An all terrain vehicle ("ATV") is disclosed having a frame with front, rear, right, and left sides. An engine and at least two wheel axes are disposed on the frame. A plurality of wheels are disposed on the at least two wheel axes. The engine includes a cylinder disposed adjacent a crankshaft and a generator operatively connected to the crankshaft. An output shaft, separate from the crankshaft, operatively connects to the engine to transmit power from the engine to at least one of the plurality of wheels through at least one of the wheel axes. The output shaft is disposed between the cylinder and the generator in a plane substantially perpendicular to at least one of the wheel axes.

28 Claims, 28 Drawing Sheets

U.S. PATENT DOCUMENTS

| | | | | |
|---|---|---|---|---|
| 5,514,040 A | * | 5/1996 | Robert | 474/13 |
| 5,667,029 A | * | 9/1997 | Urban et al. | 180/65.2 |
| 5,894,756 A | * | 4/1999 | Uehara et al. | 74/7 B |
| 6,070,495 A | * | 6/2000 | Kuroda et al. | 74/650 |
| 6,076,624 A | * | 6/2000 | Izumi et al. | 180/291 |
| 6,149,540 A | * | 11/2000 | Johnson et al. | 474/14 |
| 6,155,371 A | * | 12/2000 | Izumi | 180/292 |
| 6,182,784 B1 | * | 2/2001 | Pestotnik | 180/376 |
| 6,186,258 B1 | * | 2/2001 | Deutschel et al. | 180/197 |
| 6,213,107 B1 | * | 4/2001 | Gyllenstedt | 123/572 |
| 6,328,122 B1 | * | 12/2001 | Yamada et al. | 180/65.3 |
| 6,412,368 B1 | * | 7/2002 | Seki et al. | 74/650 |
| 6,454,040 B1 | * | 9/2002 | Fukuda | 180/374 |
| 6,464,026 B1 | * | 10/2002 | Horsley et al. | 180/65.2 |
| 6,510,916 B2 | * | 1/2003 | Hori et al. | 180/374 |

FOREIGN PATENT DOCUMENTS

| | | | | |
|---|---|---|---|---|
| EP | 0402719 | * | 6/1990 | 180/292 |
| JP | 401064549 | * | 9/1987 | 310/152 |
| JP | 2241831 A | * | 3/1989 | 180/297 |
| JP | 403086630 | * | 8/1989 | 180/297 |

* cited by examiner

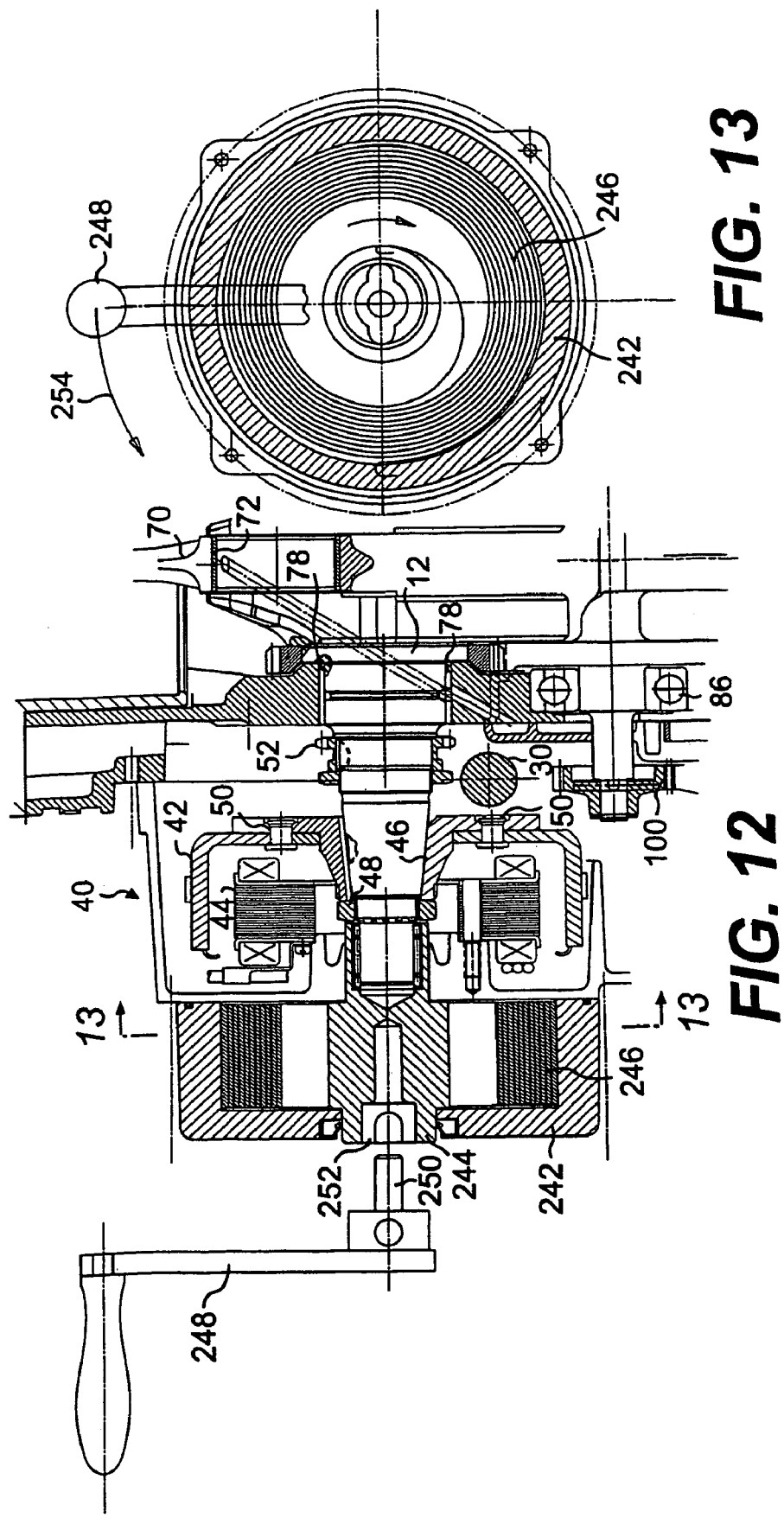

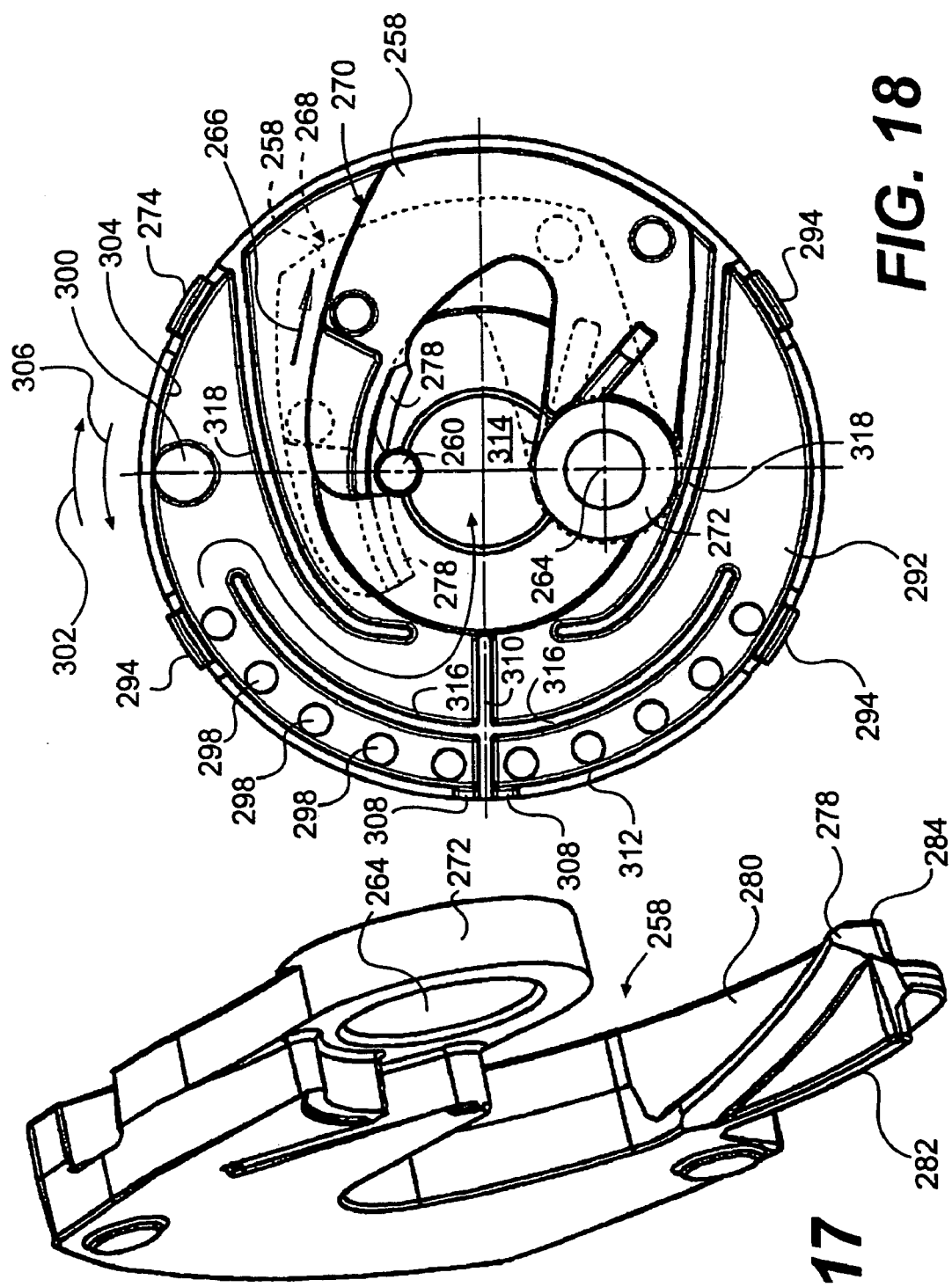

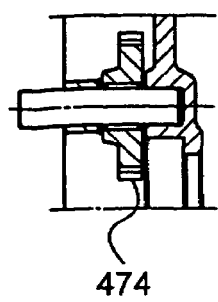
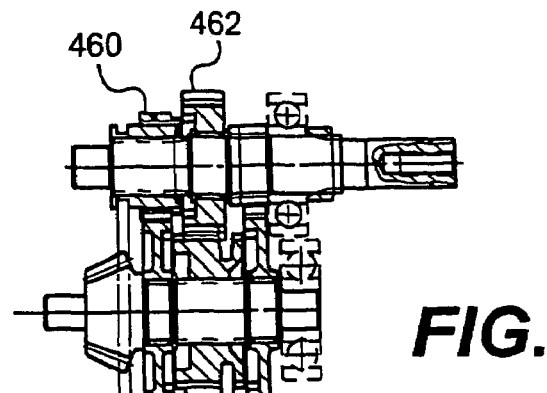
FIG. 36
FIG. 35
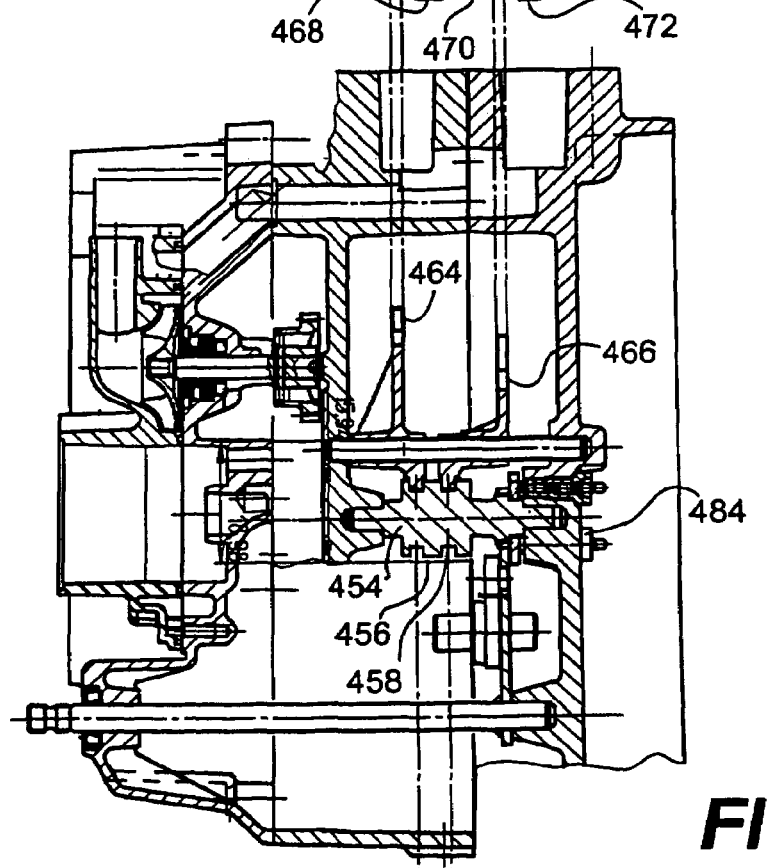
FIG. 34
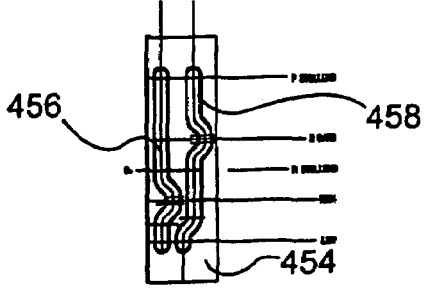
FIG. 37

COMPONENT ARRANGEMENT FOR AN ALL TERRAIN VEHICLE

This application is a continuation of prior application Ser. No. 09/943,737, filed Sep. 4, 2001, now U.S. Pat. No. 6,896,087. Prior application Ser. No. 09/943,737 claims priority to provisional applications Ser. No. 60/316,027, filed Aug. 31, 2001; Ser. No. 60/263,501, filed Jan. 24, 2001; and Ser. No. 60/229,338, filed Sep. 1, 2000. Through prior application Ser. No. 09/943,737, the present application claims priority to all three provisional applications. All four of these applications are incorporated herein by reference.

BACKGROUND OF THE INVENTION

1. Field of the Invention

The present invention relates to the design and construction of an all terrain vehicle ("ATV"). More specifically, the present invention relates to the relative positioning of several components of an ATV with respect to one another.

2. Description of the Prior Art

The prior art is replete with examples of ATVs of all varieties. In each example, however, the positioning of various components of the engine, transmission, and output shaft in relationship the frame does not provide for a compact construction for the ATV.

One prior art example of a layout for an ATV is described in U.S. Pat. No. 6,076,624 (the '624 patent).

The '624 patent describes and illustrates an all terrain vehicle with an engine disposed in a cylinder-forward position. As illustrated in FIG. 4 of the '624 patent, the axis L2 through the cylinder 108 is offset to one side of the centerline C of the vehicle 20 in the opposite direction from the axis L3 along which the V-belt 184 rotates. According to the '624 patent, this provides for a construction where the engine 30 and the transmission 144 are balanced on either side of the centerline C of the vehicle 20. This reportedly provides for an ATV with greater side-to-side stability.

As also illustrated in FIG. 4, rear drive shaft 98 lies along the centerline C of the vehicle 20 and, as a result, falls between the cylinder 108 and the transmission 144. In the vehicle 20 illustrated, the transmission 144 is a continuously variable transmission ("CVT"). A generator coil 138 is disposed on a side of the engine 30 opposite to that on which the transmission 144 is disposed.

While the '624 patent purports to provide a compact construction for the layout of an ATV, there are still further arrangements that can improve upon the prior art and provide a still more compact arrangement.

SUMMARY OF THE INVENTION

In view of the foregoing, it is therefore one object of the present invention to provide an ATV with a compact component layout.

Accordingly one aspect of the present invention is to provide an ATV with a frame. An engine and at least two wheel axes are disposed on the frame. A plurality of wheels are disposed on the at least two wheel axes. The engine includes a cylinder disposed adjacent a crankshaft and a generator operatively connected to the crankshaft. An output shaft, separate from the crankshaft, operatively connects to the engine to transmit power from the engine to at least one of the plurality of wheels through at least one of the wheel axes. The output shaft is disposed between the cylinder and the generator in a plane substantially perpendicular to at least one of the wheel axes.

In one further aspect, an ATV is provided that further includes a CVT operatively connected between the engine and the output shaft. The cylinder is positioned between the output shaft and the continuously variable transmission.

One additional aspect of the present invention is to provide an ATV where the CVT includes a drive pulley operatively connected to the crankshaft. The CVT also has a driven pulley operatively connected to the output shaft. A belt operatively connects the drive pulley to the driven pulley. The cylinder is positioned between the output shaft and the belt.

Additionally, an aspect of the present invention is provide an ATV where the cylinder of the engine is disposed toward the rear side of the frame.

It is still another object of the present invention to provide an all terrain vehicle with a frame. An engine and at least two wheel axes are disposed on the frame. A plurality of wheels are disposed on the at least two wheel axes. The engine includes a cylinder and a crankshaft. A transmission and a vehicle output shaft are operatively connected to the engine. The transmission includes a transmission output shaft. The vehicle output shaft is operatively connected to the engine via the transmission output shaft to transmit power from the engine to at least one of the plurality of wheels through at least one of the wheel axes. The vehicle output shaft is disposed in a plane substantially perpendicular to at least one of the wheel axes. The transmission output shaft carries a bevel gear to connect the vehicle output shaft. The bevel gear transmitting power to the vehicle output shaft and being solid with the transmission output shaft.

It is still another object of the present invention to provide an ATV with a first and a second bearing. The first and the second bearing being operatively connected to the frame and the transmission output shaft being supported in the first and the second bearing. The first bearing being disposed on one side of the transmission output shaft with respect to the bevel gear and the second bearing being disposed on the other side of the transmission output shaft with respect to the bevel gear.

An additional object of the present invention is to provide an ATV where the vehicle output shaft comprises a vehicle output shaft axis. The vehicle output shaft is operatively supported by the frame to rotate around the vehicle output shaft axis. The transmission output shaft has a first journal for being supported in the first bearing. The first bearing being disposed between the vehicle output shaft axis and the first journal.

Another object of the present invention is to provide an ATV having a generator. The generator is operatively connected to the crankshaft. The vehicle output shaft is disposed between the cylinder and the generator in a plane substantially perpendicular to at least one of the wheel axes.

Still another aspect of the present invention provides for an ATV having a continuously variable transmission. The CVT is operatively connected between the engine and the output shaft. The cylinder of the engine is positioned between the output shaft and the continuously variable transmission.

An additional aspect of the present invention provides for an ATV having a CVT. The continuously variable transmission comprises a drive pulley operatively connected to the crankshaft, a driven pulley operatively connected to the output shaft, a belt operatively connecting the drive pulley to the driven pulley. The cylinder of the engine is positioned between the output shaft and the belt.

One further aspect of the present invention provides for an ATV where the cylinder of the engine is disposed at the rear side of the frame.

Another aspect of the present invention is to provide an all terrain vehicle with a frame. An engine and at least two wheel axes disposed on the frame. The engine includes a cylinder and a crankshaft. A plurality of wheels are disposed on the at least two wheel axes. A transmission is operatively connected to the engine, the the transmission including a transmission output shaft. The transmission output shaft carries a bevel gear. A vehicle output shaft is operatively connected to the engine via the transmission output shaft to transmit power from the engine to at least one of the plurality of wheels through at least one of the wheel axes. The vehicle output shaft is disposed in a plane substantially perpendicular to at least one of the wheel axes. The ATV further includes a first and a second bearing. The first and the second bearing are operatively connected to the frame. The transmission output shaft is supported in the first and the second bearing. The first bearing is disposed on one side of the transmission output shaft with respect to the bevel gear; and the second bearing being disposed on the other side of the transmission output shaft with respect to the bevel gear.

In a further aspect of the present invention an ATV is provided, wherein the bevel gear is connected to the vehicle output shaft. The bevel gear is solid with the transmission output shaft.

According to an additional aspect of the present invention a ATV with a vehicle output shaft is provided. The vehicle output shaft comprises a vehicle output shaft axis. The vehicle output shaft is operatively supported by the frame to rotate around the vehicle output shaft axis. The transmission output shaft has a first journal for being supported in the first bearing. The first bearing is disposed between the vehicle output shaft axis and the first journal.

Another aspect of the present invention is to provide an ATV having a generator. The generator is operatively connected to the crankshaft. The vehicle output shaft is disposed between the cylinder and the generator in a plane substantially perpendicular to at least one of the wheel axes.

According to a further aspect of the present invention an ATV is provided having a continuously variable transmission operatively connected between the engine and the output shaft. The cylinder of the engine of the ATV is positioned between the output shaft and the continuously variable transmission.

Another aspect of the present invention is to provide an ATV having a CVT. The CVT having a drive pulley operatively connected to the crankshaft, a driven pulley operatively connected to the output shaft, and a belt operatively connecting the drive pulley to the driven pulley. The cylinder of the engine of the ATV is positioned between the output shaft and the belt.

Yet another aspect of the present invention disposes the cylinder of the engine of the ATV at the rear side of the frame of the ATV.

BRIEF DESCRIPTION OF THE DRAWINGS

Throughout the various drawings that are appended hereto, like parts will be referred to by like reference numbers, in which:

FIG. 12 is a cross-sectional side view illustration of a hand-cranked spring starter designed for use on the engine of the present invention;

FIG. 13 is a cross-sectional end view illustration of the hand-cranked spring starter shown in FIG. 12, taken along the line 13—13;

FIG. 17 is a perspective illustration of the centrifugal weight for the decompressor of the engine of the present invention;

FIG. 18 is a rear plan view of the housing of the blow-by gas oil spearator for the engine of the present invention;

FIG. 34 is a cross-sectional view of the gear mechanism of the transmission of the present invention;

FIG. 35 is a cross-sectional view of a portion of the transmission and gearing mechanism of the engine of the present invention;

FIG. 36 is an enlarged cross-sectional side view illustration of one of the toothed wheels of the transmission and gearing mechanism of the engine of the present invention;

FIG. 37 is an enlarged portion of the gearing mechanism of the engine of the present invention;

DESCRIPTION OF THE PREFERRED EMBODIMENTS

Figure 1:
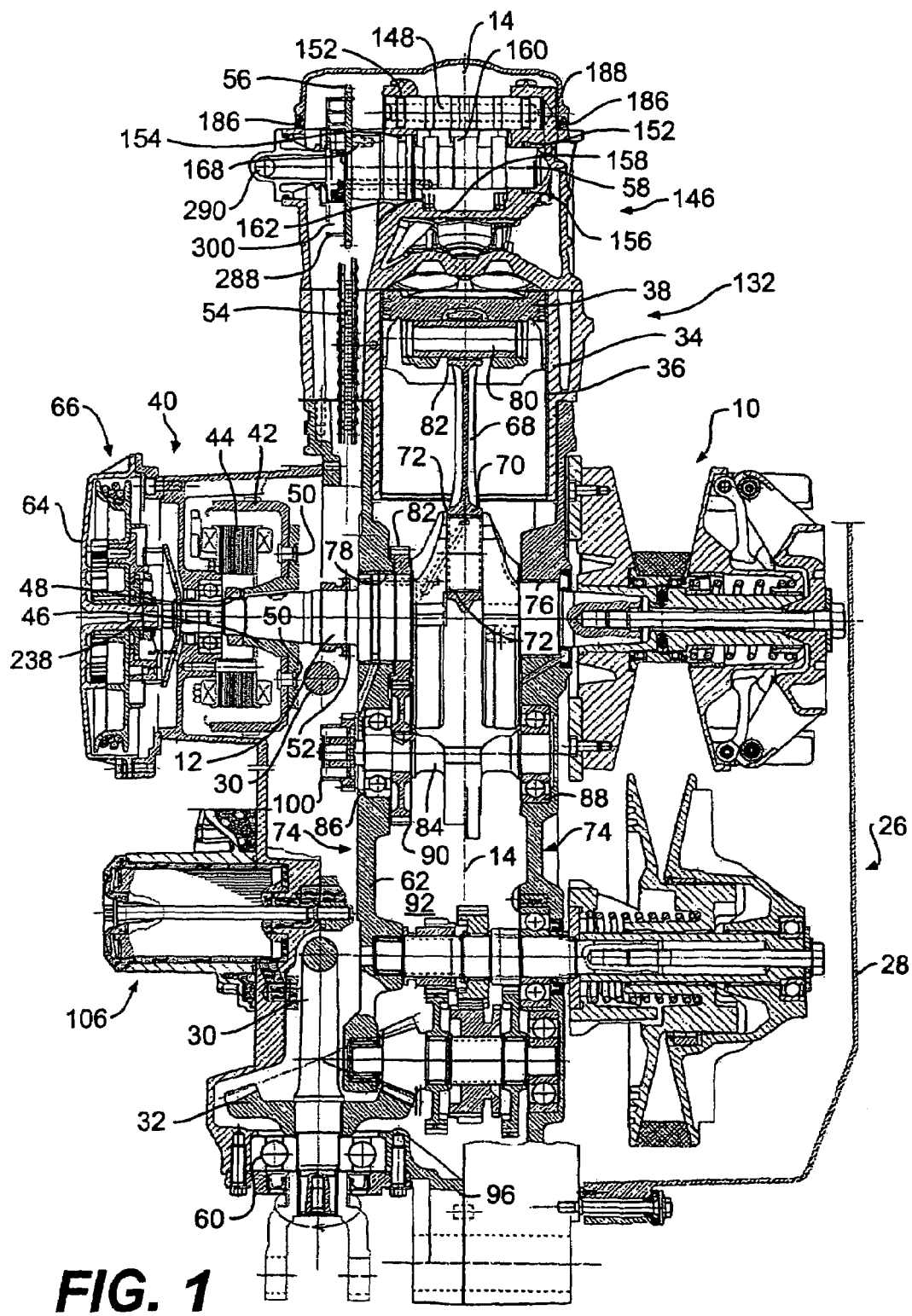
FIG. 1 is a cross-sectional view of the engine of the present invention taken perpendicularly to the longitudinal centerline of the engine (the centerline being defined as the line running through the center of the single cylinder of the engine)

To facilitate an understanding of the present invention, the following description is divided into a number of subparts.

Although the description that follows is directed to a single cylinder, internal combustion engine with an associated CVT, it should be noted that the invention is not limited to such. Instead, the features of the present invention may be applied to any type of internal combustion engine, as would be appreciated by those skilled in the art. For example, the features of the present invention may be applied to a multiple-cylinder, in-line, v-type, or opposed cylinder engine without deviating from the scope of the present invention.

Furthermore, while the present invention preferably includes a CVT for use with a single cylinder engine, those skilled in the art would readily appreciate that the CVT of the present invention could be easily used with any other type, style, or size of internal combustion engine. Moreover, while a CVT is preferred for use with the engine of the present invention, it would be readily appreciated by those skilled in the art that a standard gear shift could be substituted for the CVT without deviating from the scope of the present invention.

In addition, while the engine and CVT of the present invention have been specifically designed for use in an ATV, which is the preferred use for the present invention, the present invention is not limited just to use on ATVs. To the contrary, the present invention may be used in any vehicle type, including cars, scooters, motorcycles, and other suitable vehicles.

1. The Engine, Generally

The engine of the present invention is generally designated 10 throughout the drawings. The engine 10 includes a crankshaft 12 mounted transversely to the centerline 14 thereof. This construction is common for engines used in vehicles such as motorcycles, for example.

As mentioned above, the engine 10 is designed to be mounted preferably on the frame 17 of an ATV 16. One possible design for the ATV 16 is shown in dotted lines in FIG. 2. As illustrated, the engine 10 is positioned between the front wheels 18 and the rear wheels 20 of the ATV 16. A top schematic view of the position of the engine 10 in the ATV 16 is provided in FIG. 3. While the specific positioning of the engine 10 on the frame 17 of the ATV 16 is one feature of the present invention, the specific positioning will be described in greater detail below, following the discussion of the individual components that make up the engine 10 and the CVT 26 of the present invention.

In the preferred embodiment of the present invention, the engine 10 is carburetted. However, the present invention is not meant to be limited solely to carburetted engines. To the contrary, it is contemplated that the engine 10 could be provided with any other type of fuel delivery system without departing from the scope of the present invention. In particular, it is contemplated that the engine 10 of the present invention could be provided with a suitable fuel injection system.

Figure 3:
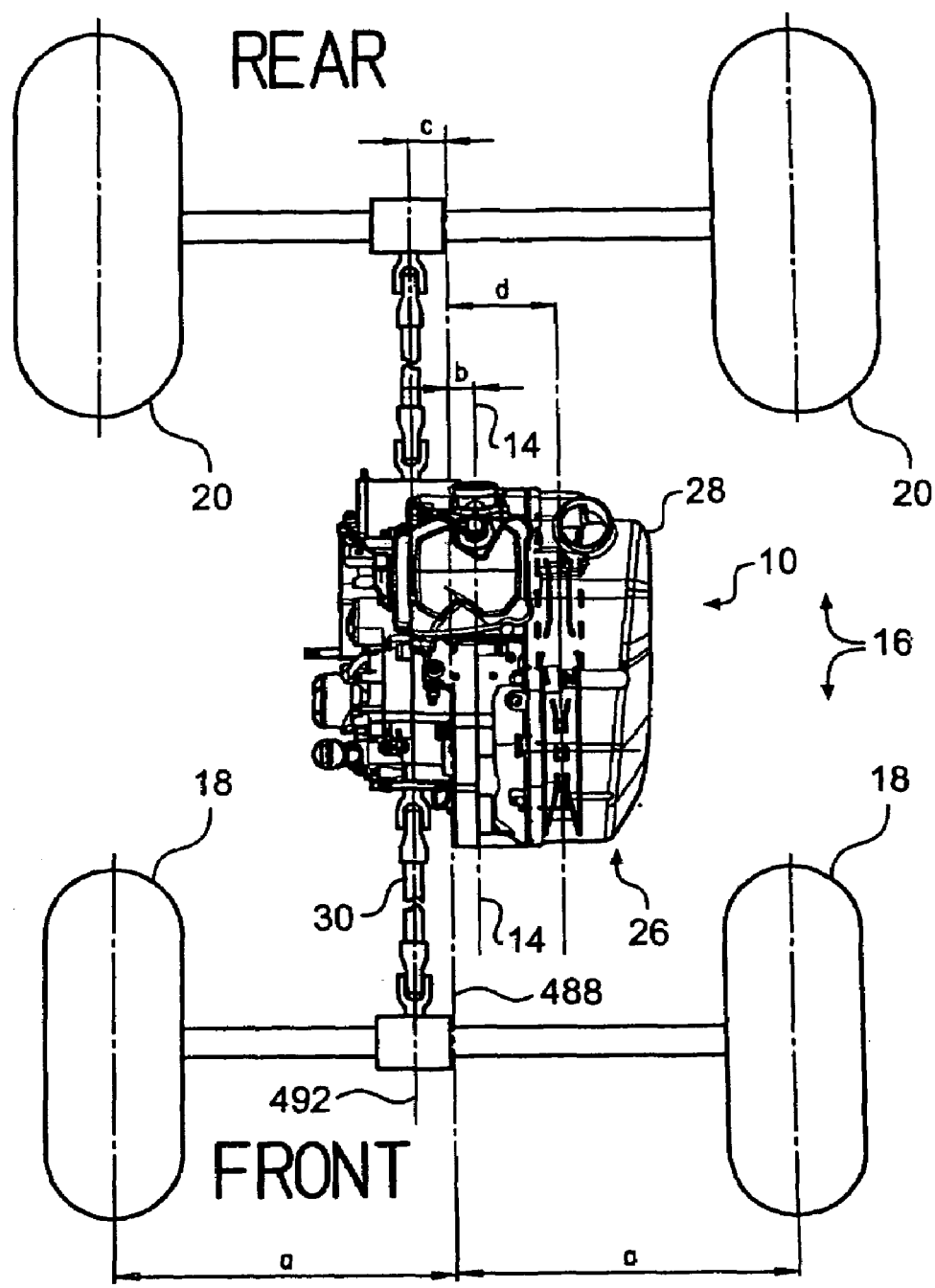
FIG. 3 is a top view schematic illustration of the ATV illustrated in FIG. 2, showing the positioning of the engine of the present invention with respect to the centerline of the ATV.

In the preferred embodiment of the ATV 16 of the present invention, which is illustrated in FIG. 3, the intake side 22 of the engine 10 faces the rear of the ATV 16 and the exhaust side 24 of the engine 10 faces the front. While this orientation of the engine 10 in the ATV 16 is preferred, it is contemplated that the orientation of the engine 10 could be reversed without deviating from the scope of the present invention.

Figure 2:
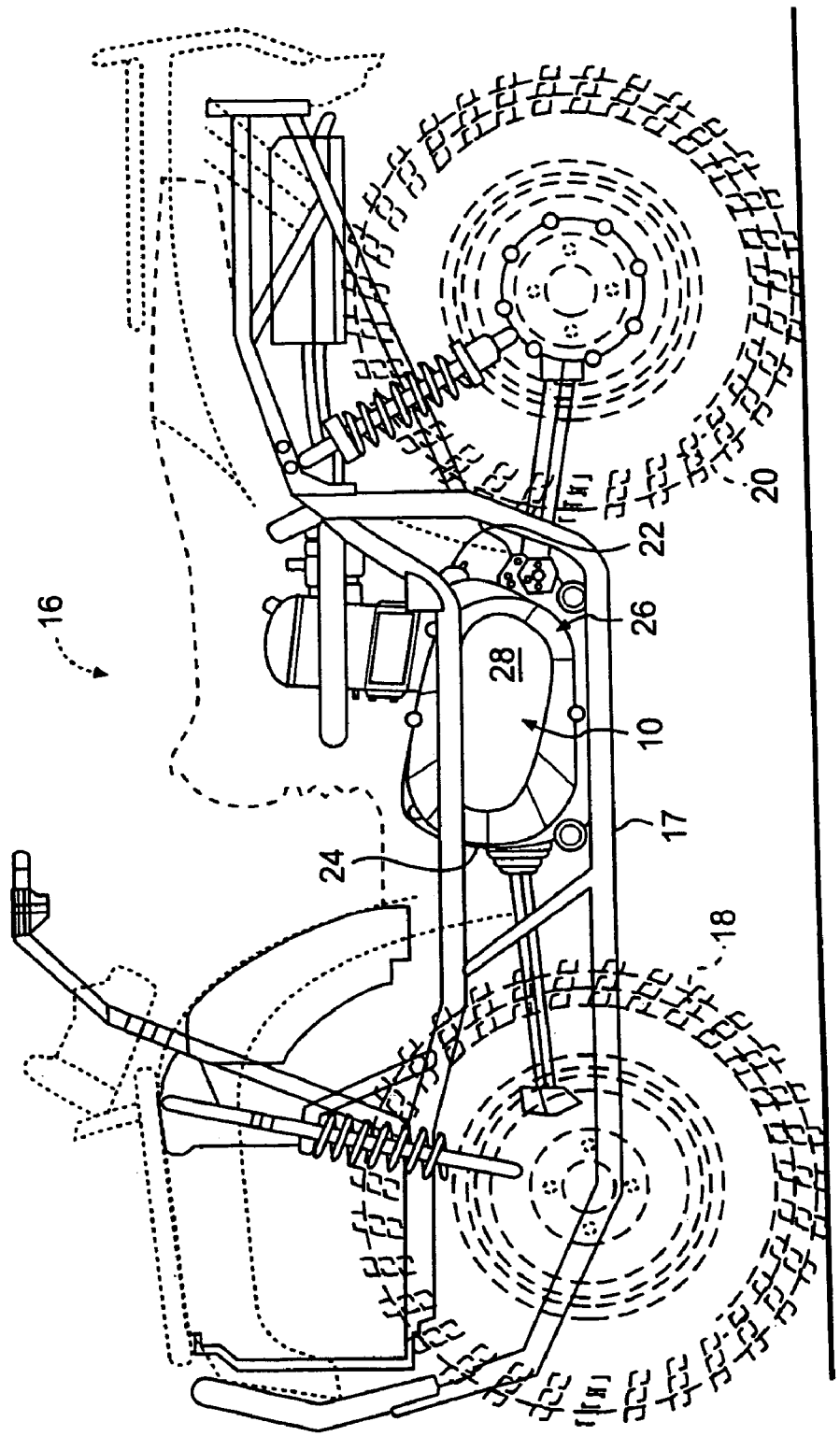
FIG. 2 is a side view of an ATV with the engine of the present invention positioned thereon, the details of the ATV being shown in dotted-line format.

As illustrated in FIGS. 1–3, the engine 10 is provided with a CVT 26, the moving components of which are enclosed within a cover 28. The CVT 26 is described in greater detail below. With the engine 10 in the preferred orientation, as illustrated in FIG. 3, the CVT 26 is positioned on the left hand side of the ATV 16.

The CVT 26 operatively communicates with an output shaft 30 through a bevel gear 32 to provide power to the front wheels 18 and the rear wheels 20 of the ATV 16. Motive power for the four-wheel drive is transmitted to the output shaft 30 via the bevel gear 32. While an all-wheel drive is preferred for the ATV 16 of the present invention, the ATV 16 could be a front-wheel or rear-wheel drive variety without deviating from the scope of the present invention.

Preferably, the cylinder 34 is positioned at the rear of the ATV 16. In such a position, the cylinder 34 creates free space for the driver's legs between in front of the engine 10. The positioning of the cylinder.34 to the rear of the ATV 16 also provides for storage space at the front of the engine 10. While this orientation is preferred, it is contemplated that the orientation of the engine 10 could be reversed 180° so that the cylinder 34 faces the front of the engine and the CVT 26 faces to the right-hand side of the AVT 16. Changing the orientation of the engine 10 has the further advantage of shifting the center of gravity of both the engine 10 and the ATV 16 in a forward direction, which has advantages in ATVs that are more sporty than the one depicted in FIG. 2.

The cylinder 34 and cylinder liner 36 preferably are made of conventional materials, such as AlSi alloys for the cylinder 34 and grey cast iron for the cylinder liner 36. To assemble the combined cylinder 34 and cylinder liner 36, the cylinder liner 36 preferably is held in a mold and the cylinder 34 is cast around it.

In a more advanced approach, the cylinder liner 36 is deposited in the cylinder 34 by a plasma coating process or some other thermal spraying process. If manufactured according to such a process, a separate cylinder liner 36 is not required. Instead, the cylinder 34, which is preferably made from an aluminum alloy (e.g., AlSi), has a wear-resistant coating applied thereto. The coating is sprayed onto the surface of the bore of the cylinder 34. The coating may be made of any suitable material such as one based on iron or steel containing some other metallic components (e.g., Cr, Mo, C) and containing specific oxides (e.g., iron oxides).

2. The Generator, the Camshaft Chain Drive, and the Output Shaft

The engine 10 includes a generator 40. The generator 40 preferably is a permanently excited 3-phase generator in which a magnet wheel 42 rotates around stationary coils 44, as shown in FIG. 1. Such a construction for the generator 40 offers a number of advantages over generators known in the prior art where the coil rotates around a stationary magnet. First, the potential for generator failure is reduced because only the magnet wheel 42 rotates, not the coil 44. In addition, maintenance and repair time for the generator 40 may be significantly reduced. Also, the weight of the rotating masses (i.e., the magnet wheel 42) can be reduced, which reduces the overall vibration generated by the engine 10.

In the preferred embodiment of the present invention, the magnet wheel 42 is constructed as an extrusion-molded part and is mounted on a hub 46. The hub 46, in turn, is mounted onto a tapered portion of the crankshaft 12 and secured there by a nut 48. The magnet wheel 42 preferably is connected to the hub 46 by rivets 50. While the magnet wheel 42 is preferably connected to the crankshaft 12 in this manner, it is contemplated that the magnet wheel 42 could be connected to the crankshaft in any number of alternate ways without deviating from the scope of the present invention.

A chain wheel 52 is positioned adjacent to, and at the inner side of, the generator 40. The chain wheel 52 is fixed to the crankshaft 12 through any suitable means known to those skilled in the art. The chain wheel 52 drives the timing chain 54 that extends between the chain wheel 52 and the timing gear 56 on the camshaft 58. It is contemplated that the chain wheel 52 may be attached to the crankshaft 12 via a nut (not shown). Alternatively, the chain wheel 52 may be affixed to the crankshaft 12 via a key arrangement (also not shown) or via a force fit. While a nut is the preferred manner of connection between the chain wheel 52 and the crankshaft 12, any alternative connection may be employed without deviating from the scope of the present invention.

The main bearing 60 of the output shaft 30 is positioned below the chain wheel 52, between the position of the magnet wheel 42 and the crankcase housing wall 62. The output shaft 30 is arranged in the partition plane between the crankshaft housing wall 62 and the cover 64 of the pull starter 66. With this construction, the engine 10 may be provided with a compact construction in the lateral direction.

The output shaft 30 is positioned relatively close to the centerline (or central axis) 14 of the engine 10 (see distance c in FIG. 3). This allows the engine 10 to be positioned in the frame 17 of the ATV 16 in either a cylinder backward orientation (e.g., for utility AVTs such as the one illustrated in FIG. 2) or a cylinder forward orientation (e.g., for sport ATVs). As indicated above, the engine 10 preferably is mounted in a cylinder backward position. However, also as indicated above, the positioning of the engine 10 may be reversed 180° in the ATV 16 merely by flipping the differentials to which the output shaft 30 connects. The output shaft 30 preferably is adapted to project from both sides of the engine 10 so that both 4-wheel and 2-wheel drive modes may be accommodated, as indicated above.

The engine 10 may be positioned as shown for regular utility ATV's (thereby providing more room for a step-through chassis) or may be reversed with the cylinder and intake in front for sport ATV's (which generally do not include a step-through arrangement). In the reversed position, with the intake manifold positioned in the air stream of the vehicle where the air is cooler than at the exhaust side of the engine 10, high end power for a sport model, at the expense of low end torque, may be improved.

3. The Crankshaft and the Connecting Rod

The crankshaft 12 preferably is formed as a single piece construction. As would be known to those skilled in the art, a single piece construction for the crankshaft 12 offers a number of advantages in terms of cost and strength. While an integral construction for the crankshaft 12 is preferred, it is contemplated that the crankshaft 12 may be assembled from a number of separate components, as also would be known to those skilled in the art.

The crankshaft 12 is driven by the piston 38 via a connecting rod 68. Preferably, the connecting rod 68 is a crack-type member. This means that the lower end 70 of the connecting rod 68 is manufactured as an integral part of the connecting rod 68. After casting, the lower end 70 is cracked open. This is done by applying a force to the opening through the lower end 70 (that surrounds the crankshaft 12, when installed in the engine 10). In this manner, the connection between the halves of the lower end 70 of the connecting rod 68 is improved considerably. Of course, as would be appreciated by those skilled in the art, the connecting rod 68 could be manufactured according to any other suitable method or process.

In the preferred embodiment of the present invention, the mounting between the crankshaft 12 and the connecting rod 68 is worthy of some additional description. In particular, it is preferred that a slide bearing 72 be positioned between the connecting rod 68 and the crankshaft 12. The provision of a slide bearing 72 in this location distinguishes the engine 10 of the present invention from engines in the prior art. In particular, similar engines in the prior art incorporate anti-friction (ball) bearings between the connecting rod and crankshaft.

When designing an engine, especially one that is expected to operate at extremely low temperatures (e.g., −30° C. and below), the type of bearing inserted between the connecting rod and the crankshaft becomes a significant concern. The problem is associated with the viscosity of the lubricating oil at such low temperatures. In particular, oil at low temperatures may become so viscous that it cannot flow properly in and around the bearings between the connecting rod and the crankshaft. If this occurs, the engine cannot operate because it cannot crank or turn over.

To avoid this problem, engines in the prior art incorporate antifriction bearings between the connecting rod and the crankshaft. As a rule, engine designers avoided slide bearings, because it was believed that the viscosity of lubrication in slide bearings at low temperatures would be too high to permit the engine to crank. Specifically, because of the temperature dependence of the lubricants, the reduced bearing clearance in slide bearings was thought to result in hydrodynamic frictional forces so high at low temperatures that too much torque would be required to start the engine. To provide such a torque, it was thought that the engine would require a stronger battery than desired or would require additional starting aid measures.

As it turns out, at least with respect to the engine 10 of the present invention, the slide bearing 72 does not hinder start up at low temperatures. In fact, it was discovered through testing that friction between the piston 38 and the cylinder 34 (or cylinder liner 36) is the primary impediment to starting the engine 10 at low temperatures. Therefore, the increased friction in the slide bearing 72 (as compared to an antifriction bearing) does not appear to lead to any substantial deterioration of the cold starting properties of the engine 10.

While it is preferred to incorporate a slide bearing 72 between the connecting rod 68 and the crankshaft 12, it is contemplated that the engine 10 of the present invention could incorporate any other type of bearing at the same location. Specifically, as would be understood by those skilled in the art, a conventional antifriction (ball or roller) bearing may be substituted for the slide bearing 72 without deviating from the scope of the present invention.

As FIG. 1 illustrates, the crankshaft housing (or crankcase) 74 of the engine 10 is vertically partitioned, thus resulting in a very stiff structure. The vertical partitioning of the crankcase 74 has an additional advantage in that it is possible to arrange the bearings 76, 78 more freely, since it is not necessary to arrange all the bearings 76, 78 in the plane of partition (as would be required by engines in the prior art). For this reason, among others, it becomes possible to design the engine 10 to be short and compact.

In addition to providing a slide bearing between the connecting rod 68 and the crankshaft 12, the engine 10 of the present invention also provides a bushing 80 between the upper end 82 of the connecting rod 68 and the piston 38. As with the slide bearing 72 at the lower end 70 of the connecting rod 68, the provision of the bushing 80 at the upper end 82 of the connecting rod 68 is also a departure from the teachings of the prior art. To avoid starting problems, engines in the prior art also included an antifriction (needle) bearing between the top of the connecting rod and the piston. The bushing 80 in the engine 10 of the present invention preferably is made of nonferrous heavy metal. As would be appreciated by those skilled in the art, however, the bushing 80 may be made from any suitable material without deviating from the scope of the present invention.

4. The Balance Shaft

As illustrated in FIG. 1, a toothed wheel 82 operatively connects the crankshaft 12 to a balance shaft 84. The balance shaft 84 extends between antifriction bearings 86, 88 and provides mass balancing of the first order. As illustrated in FIG. 1, the toothed wheel 82 meshes with a toothed wheel 90 on the balance shaft 84. One difference between the gearing between the toothed wheels 82, 90 and the gearing between the crankshaft and balance shafts in engines of the prior art is that, in the engine 10, the gearing is spiral. A spiral gearing is better than a non-spiral gearings because it is quieter than a non-spiral (or regular gearing).

The engine 10 also differs from the construction taught by the prior art in that the toothed wheels 82, 90 intermesh within the interior space 92 of the crankcase 74. In this position, the toothed wheels 82, 90 are positioned between the two bearings 86, 88 at either end of the balance shaft 84 and also between the slide bearings 76, 78 at either end of the crankshaft 12. Advantageously, placing the toothed wheels 82, 90 in this position avoids a space conflict with the output shaft 30. At the same time, excellent lubrication of the toothed wheel gears 82, 90 is ensured. Moreover, with such a construction, use of the space 92 is improved over engines in the prior art, making it possible to construct a compact engine 10.

As discussed above, unlike the crankshaft 12, the balance shaft 84 preferably is mounted in antifriction bearings 86, 88. However, as would be appreciated by those skilled in the art the antifriction bearings 86, 88 may be replaced with other bearings without deviating from the scope of the present invention. For example, the antifriction bearings could be replaced with slide bearings.

5. The Oil Circuit

Figure 4:
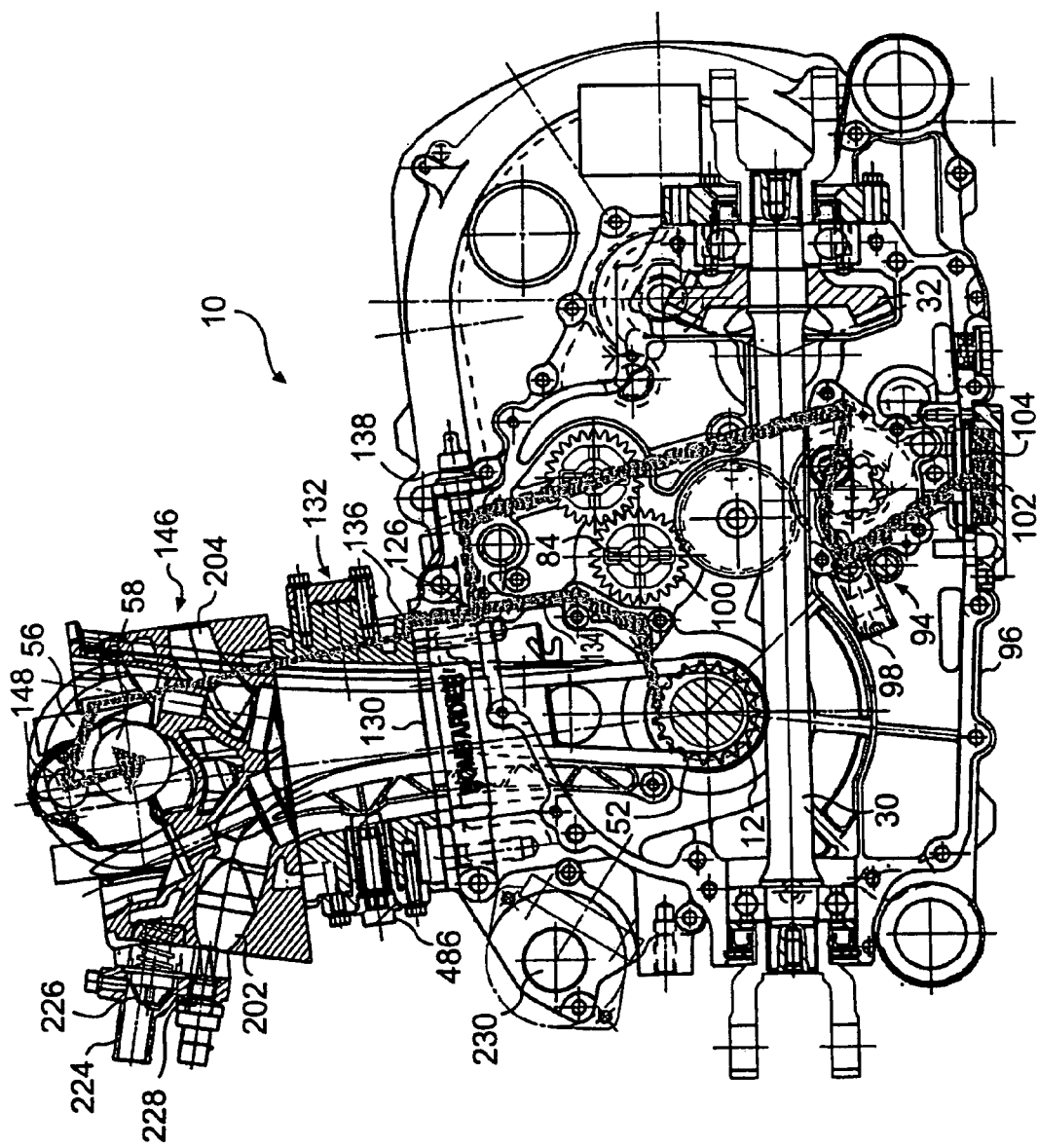
FIG. 4 is a cross-sectional side view illustration of the engine of the present invention, highlighting at least a portion of the oil flow path within the engine.

An oil pump 94 is operatively connected to the end of the balance shaft 84 exteriorly to the crankcase housing wall 62, as illustrated in FIG. 4. So constructed, the balance shaft 84 drives the oil pump 94. Specifically, the end of the balance shaft 84 is provided with a toothed gear 100 that is connected, through at least one additional gear (not shown), to a drive gear (not shown) associated with the oil pump 94. Of course, as would be appreciated by those skilled in the art, the oil pump 94 could be connected to the balance shaft 84 by a single gear, a plurality of gears, or any other suitable connecting arrangement.

As shown in FIG. 4, the oil pump 94 preferably is positioned as far to the bottom 96 of the crankcase 74 as possible. Such a positioning reduces the suction height from the bottom 96 of the crankcase 74 to the oil pump 94, thereby reduding the danger of an irregular flow pattern of oil to the oil pump 94. Positioning the oil pump 94 near the bottom 96 of the crankcase has the further advantage of minimizing (or preventing) air from being sucked into the oil passage with the oil from the oil pan 102, thereby helping to minimize or prevent foaming and cavitation within the oil pump 94. This feature is particularly important for an engine designed for use on an ATV (such as the engine 10 of the present invention), because the engine 10 may operate at very low temperatures (−30° C. or lower). At these low temperatures, oil viscosity increases significantly, which means that the oil's resistance to flow also increases porportionally.

It is preferred that the oil pump 94 be a conventional, rotary piston pump (trochoidal pump). In addition, it is preferred that the oil pump 94 supply the engine 10 with the required amount of oil by means of a wet-sump pressure lubrication. Alternatively, the oil pump 94 could be a gear pump without deviating from the scope of the present invention.

As illustrated in FIG. 4, the oil circuit, which is shaded to facilitate an understanding of the oil flow path, includes a pressure relief valve 98, which acts as a safety device that opens upon sensing an oil over-pressure.

When the engine 10 is operating, oil is sucked by the oil pump 94 from the wet sump (oil pan) 102 via a coarse filter sieve 104. The oil pump 94 is positioned in the middle of the engine housing so that the oil pump inlet dips into the wet sump 102. So positioned, the engine 10 is expected to be able to self-lubricate regardless of the angular orientation (preferably, up to 45°) of the ATV 16 carrying it.

Figure 5:
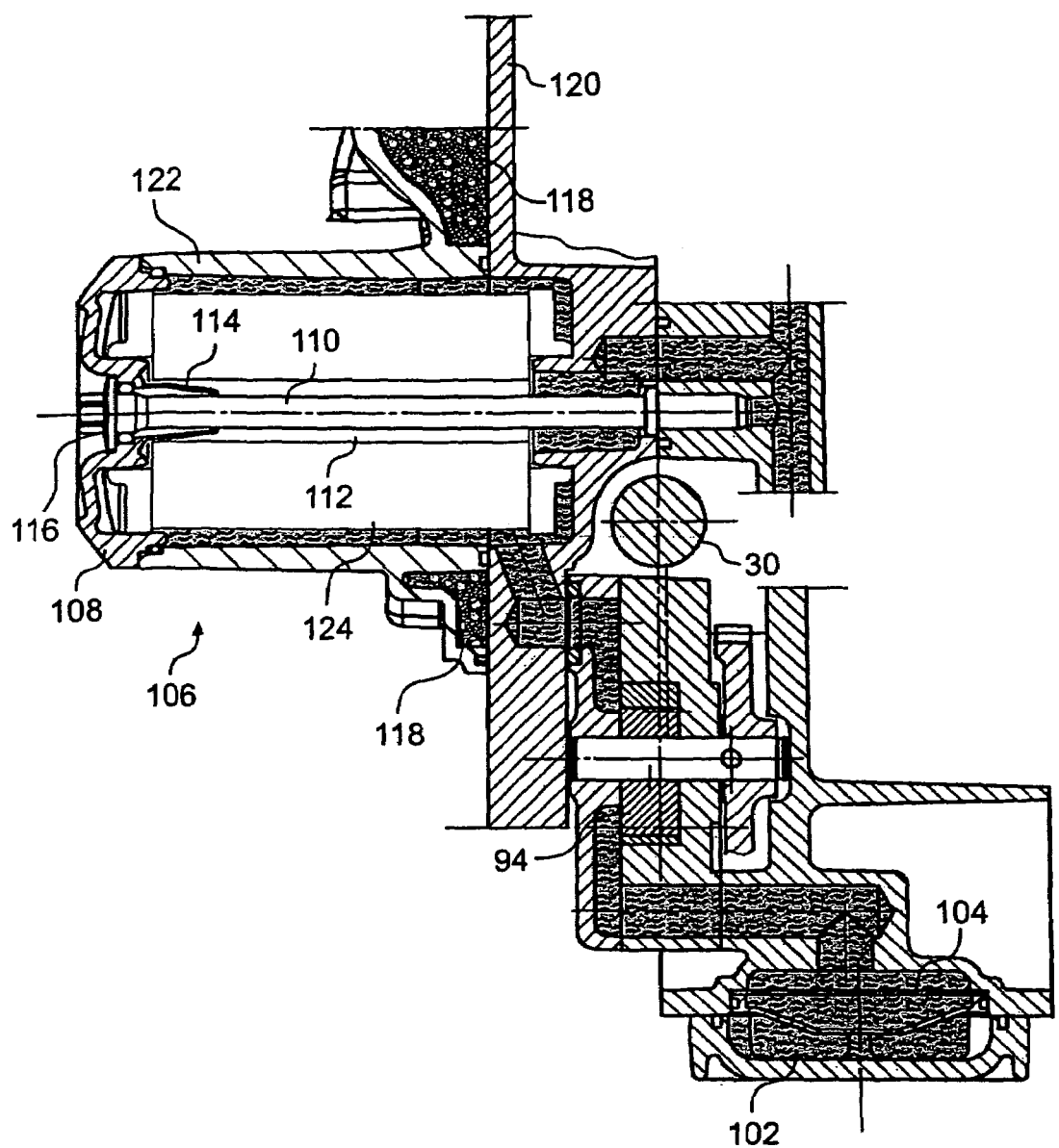
FIG. 5 is a cross-sectional view of the relative positioning of the oil filter with respect to the oil pump and oil pan.

The oil leaves the oil pump 94 and flows directly to the oil filter 106 where fine particulate materials, such as carbon, are removed therefrom. As illustrated in FIG. 1 and, in greater detail, in FIG. 5, the oil filter 106 is positioned above the oil pump 94, roughly at the same elevation from the bottom 96 of the engine 10 as the crankshaft 12, and includes an oil filter cover 108 affixed to the engine 10 by a single, central screw 110. When the central screw 110 is removed from the filter cover 108, the oil drains through the central threaded hole, which is opened when the central screw 110 is removed. A seal 114 surrounds the outward end 116 of the central screw 110.

The oil filter 106 is surrounded by a cooling water jacket 118. Cooling water is circulated through the jacket 118 to remove heat from the oil passing through the oil filter 106. The water pump casing 120 and the engine cover (generator cover) 122 also form part of the housing for the oil filter 106.

The position of the oil filter 106 is worthy of particular attention. Since ATV's 16 are often operated under extreme conditions, significant demands typically are placed on the engines 10. Increased demand on the engine 10 results in an increased entrapment by the oil of carbon particles, which directly result from the combustion of fuel. Because the oil in the engine 10 of the present invention is expected to entrap particulate material more quickly than an engine designed for use on a vehicle other than an ATV 16, the replaceable portion 124 (i.e, the disposeable or recycleable portion) of the oil filter 106 will need to be replaced more frequently.

The design of the oil filter 106 of the present invention greatly facilitates removal and replacement of the replaceable portion 124. On an ATV 16, because the engine oil and replaceable portion 124 of the oil filter 106 are more frequently changed, the ease of changing the engine oil and filter 124 are of increased importance. For this reason, ready access to the oil filter 124 in the engine 10 is a particularly attractive feature of the engine's 10 design.

From the oil filter 106, the oil flows towards a distribution point 126, as illustrated in FIG. 4. From the distribution point 126, the oil flows in two directions: (1) toward the main bearings of the crankshaft 12, and (2) into a bore 128 leading to a flange 130 at the base of the cylinder block 132. The oil path toward the main bearings of the crankshaft is designated 134. The oil direction toward the cylinder block 132 is designated 136. In the direction 136, the oil passes an oil pressure transducer 138.

Figure 6:
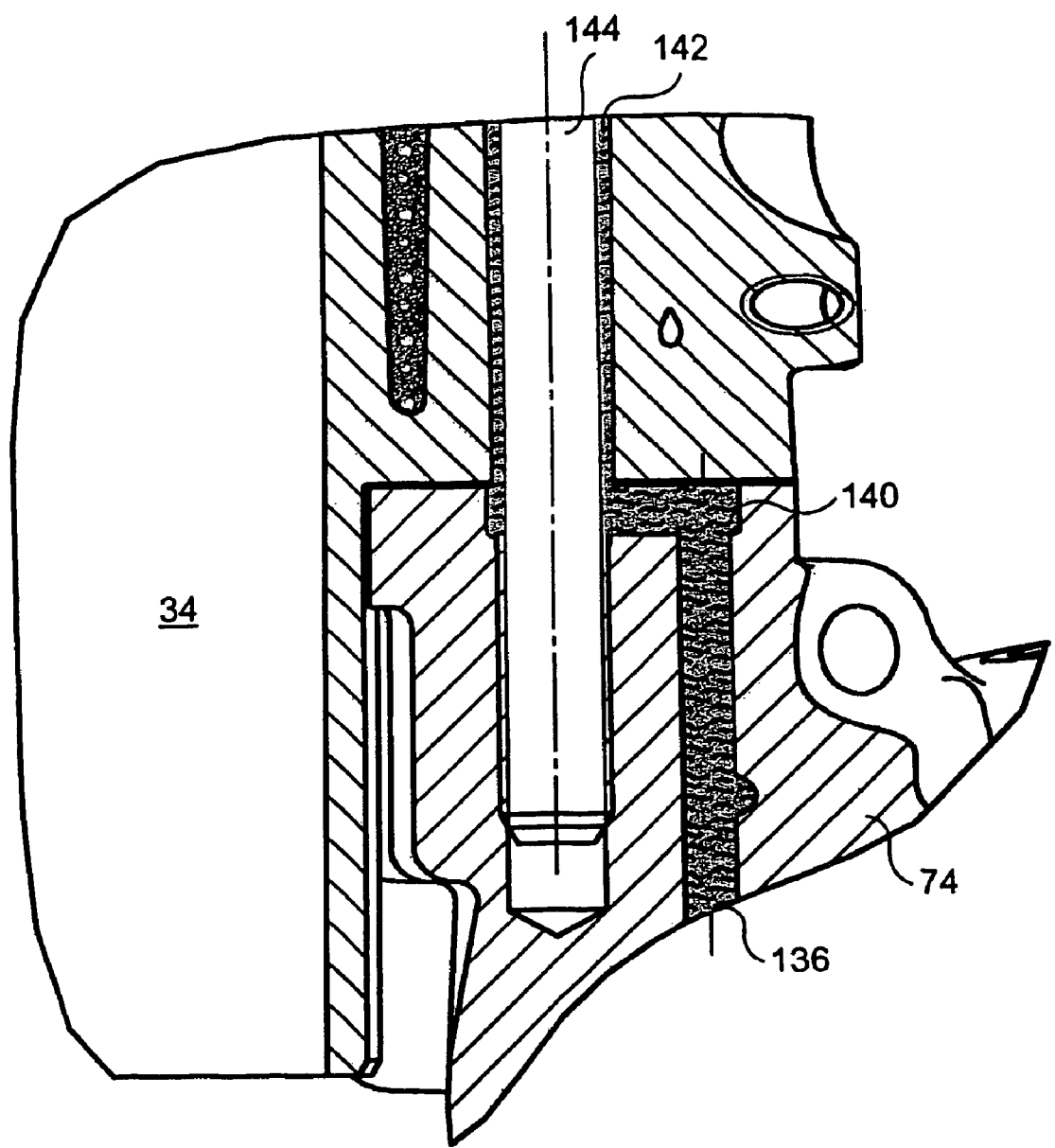
FIG. 6 is an enlarged, cross-sectional view of the oil path connecting the crankcase to the cylinder block.

As illustrated in FIG. 6, the oil enters the cylinder block 132 via a groove 140. The upper end of the crankshaft housing 74 defines an annular gap 142 between a locking screw 144 that attaches the cylinder head 146 and cylinder block 132 to the crankcase 74. In the annular gap 142, the oil rises upwardly and, at the upper end of the cylinder head 146, is directed via a bore (not shown) below the screw head towards the hollow rocker arm shaft 148. The rocker arm shaft 148 is affixed in the cylinder head 146 via two screws. Preferably, the rocker arm shaft 148 is made as a single piece construction. It is contemplated, however that the rocker arm shaft 148 may be made from a number of separate components.

The oil enters the interior of the rocker arm shaft 148 and emerges through small bore holes 150 in the rocker arm shaft 148. Accordingly, it provides adequate lubrication of the rocker arm bearings 152. From there, the oil flows to the camshaft bearings 154, 156, which are positioned therebelow, as shown in FIG. 1.

As shown in FIG. 1, below the camshaft 58, the oil accumulates in a small basin 158 in which the lobes 160 of the camshaft 58 are periodically immersed for lubricating purposes. The degree to which the basin 158 is filled, however, is not so high so as to negatively effect lubrication (e.g., by foaming). The oil flows from the basin 158 through a channel 162 in the cylinder head 146 toward the upper gear 56 to which the camshaft 58 is attached. From the channel 162, the oil drains back to the wet sump 102. During its flow to the wet sump 102, the oil lubricates the timing control chain 54.

The camshaft timing gear 56 is provided with a blow-by gas separator 164, the details of which will be provided below. The camshaft timing gear 56 preferably is connected to the camshaft 58 by means of three screws 168 (only one of which is visible in dotted lines in FIG. 1).

Figure 8:
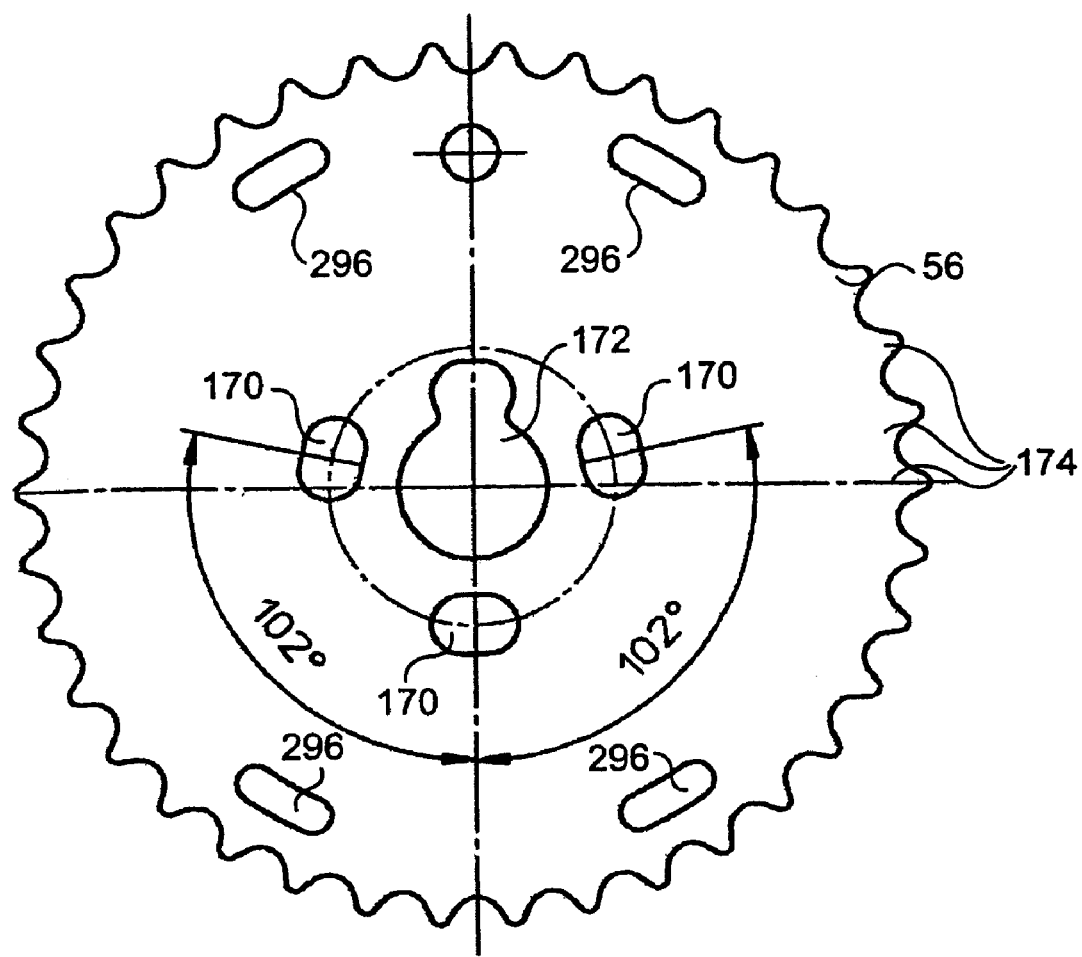
FIG. 8 is a front view of the camshaft timing gear, illustrating the mounting holes for the screws that connect the camshaft timing gear to the camshaft.

To guarantee mounting of the camshaft timing gear 56 in the correct position, the screws 168 pass through holes 170 that are arranged asymmetrically about the central hole 172. FIG. 8 illustrates this feature. As with any gear, camshaft timing gear 56 is provided with a number of teeth 174 that mesh with the timing chain 54.

Figure 7:
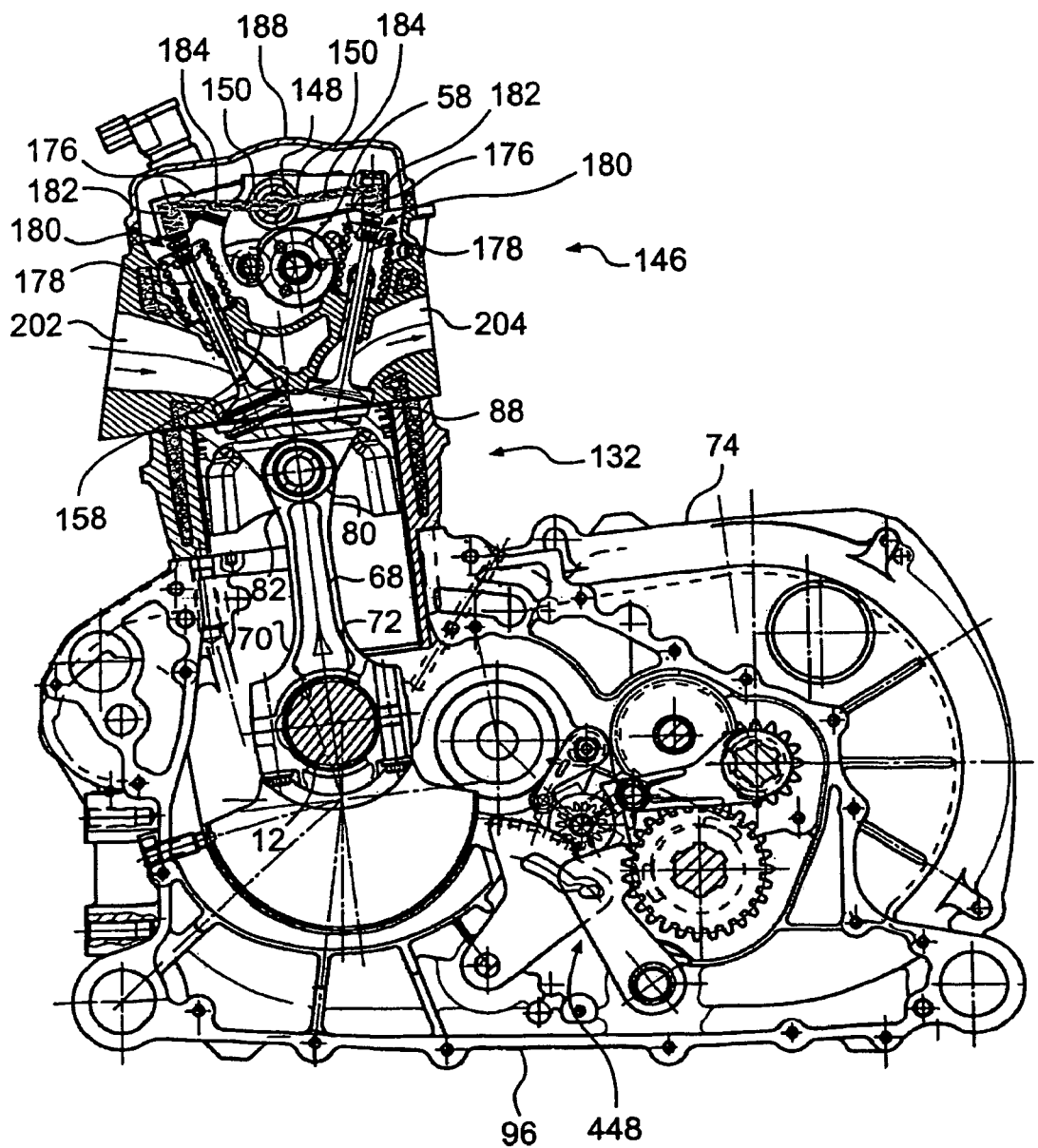
FIG. 7 is a cross-sectional, side-view illustration of the engine of the present invention, showing the: relative positioning of the piston and crankshaft to the parking assembly.

While not illustrated in detail in the drawings appended hereto, except in gross detail in FIG. 7, the connection between the rocker arms 176 and the intake and exhaust valve stems 178 differs from the prior art. Specifically, the rocker arms 176 are provided with hydraulic valve clearance balancing elements 180 on the sides facing the valve shafts, each comprising a ball socket abutting on the upper end of the respective valve stem 178. The rear side of the plunger-like balancing elements 180, which are mounted in bores of the rocker arms 176, are provided with pressurized oil via a bore 182. This bore 182 opens from the bearing site on the respective rocker arm shaft 148. In this manner, the hydraulic valve clearance balancing elements 180 receive pressurized oil from the interior of the rocker arm shaft 148 via the radial bores 184 thereof.

6. The Camshaft, the Rocker Arm Axle, the Valves, and the Cylinder Head Cover In the present design of the engine 10, the rocker arms 176 are believed to be adequate for operation of the design. However, it is preferred that the rocker arms 176 be light in weight. While "heavy" rocker arms do not impede operation of the engine 10, attempts have been made to reduce the weight of the rocker arms 176. At present, it is preferred that the rocker arms 176 be made of aluminum, as is common in the automobile industry. Rocker arms 176 made from aluminum, however, give rise to problems of stiffness or strength, respectively. Therefore, it is conceivable that the rocker arms could be made of steel. Alternatively, the rocker arms 176 may be made from an alloy containing aluminum or iron. As would be appreciated by those skilled in the art, to practice the present invention, the exact composition of the rocker arms 176 does not require only the materials recited herein.

The connection between the cylinder head 146 and the cylinder head cover 188 is acoustically decoupled. According to FIG. 1, various elastomer elements or gaskets 186, respectively, are attached between the cylinder head 146 and the cylinder head cover 188. In this manner, direct sound propagation from the cylinder head 146 to the cylinder head cover 188 is blocked. To further prevent the propagation of sound from the cylinder head 146 to the cylinder head cover 188, the fixing screws are also acoustically decoupled.

7. The Water Cooling System (Air Cooling, Optional)

Figure 9:
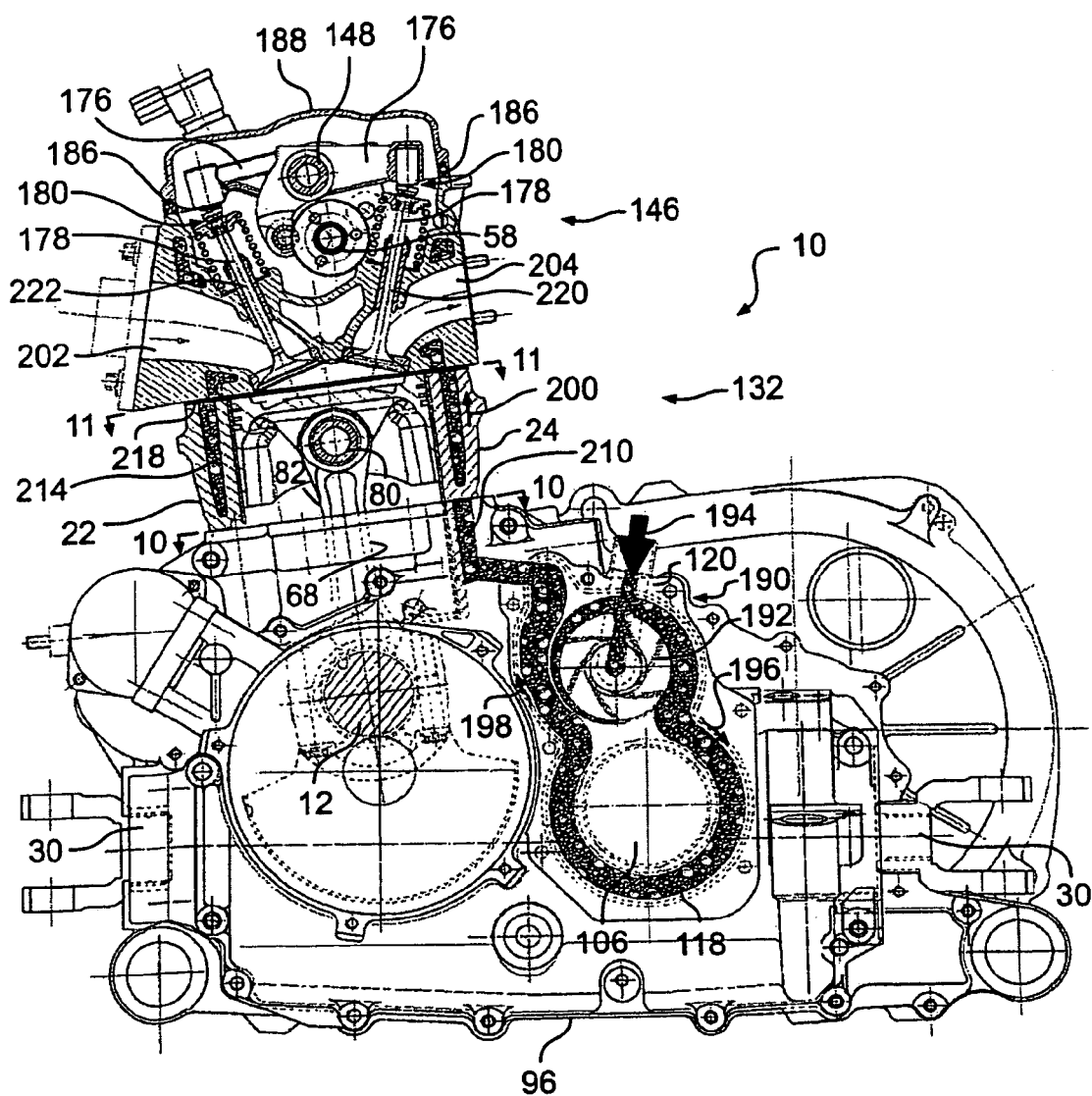
FIG. 9 is cross-sectional side view illustration of the engine of the present invention, showing in detail the water flow through the cooling system associated therewith.

Like the oil pump 94 for the engine 10 of the present invention, a water pump 190 is driven by the balance shaft 84. The position of the water pump 190 in the engine 10 is best illustrated in FIG. 9. Preferably, the water pump 190 connects to the balance shaft 84 via a toothed wheel. The toothed wheels that drive both the water pump 190 and the oil pump 94 preferably are made of non-metallic materials, such as plastic. Of course, as would be appreciated by those skilled in the art, however, the toothed driving wheels may be constructed from metal or any other suitable material. Like the oil filter 106, the water pump impeller 192 is disposed in the water pump casing 120.

In the direction indicated by the arrow 194, water enters the water pump 190 from a cooling heat exchanger (not shown) that is connected to the engine 10. Immediately after its emergence from the water pump 190, the water flows towards the oil filter 106 in the direction of arrow 196. The cooling water then enters the oil filter cooling jacket 118 disposed around the oil filter 106.

The positioning of the water pump 190 adjacent to both the oil filter 106 and the oil pump 94 is a significant improvement over engine designs in the prior art. In particular, the close proximity of these three elements to one another permits for the construction of a compact engine 10. In addition, the prior art fails to show or suggest that water from the water pump 190 may be directed through a water passage 118 around the oil filter 106 to affect cooling of the oil within the engine 10.

From the water jacket 118 around the oil filter 106, the water changes its flow direction and travels upwardly toward the cylinder head 146, as indicated by the arrow 198. The cooling water passes through the cylinder block 132, in the direction shown by the arrow 200. After the cylinder block 132, the water continues to flow upwardly until it flows through the passages in the cylinder head 146 to cool the intake passages 202 and exhaust passages 204.

Figure 10:
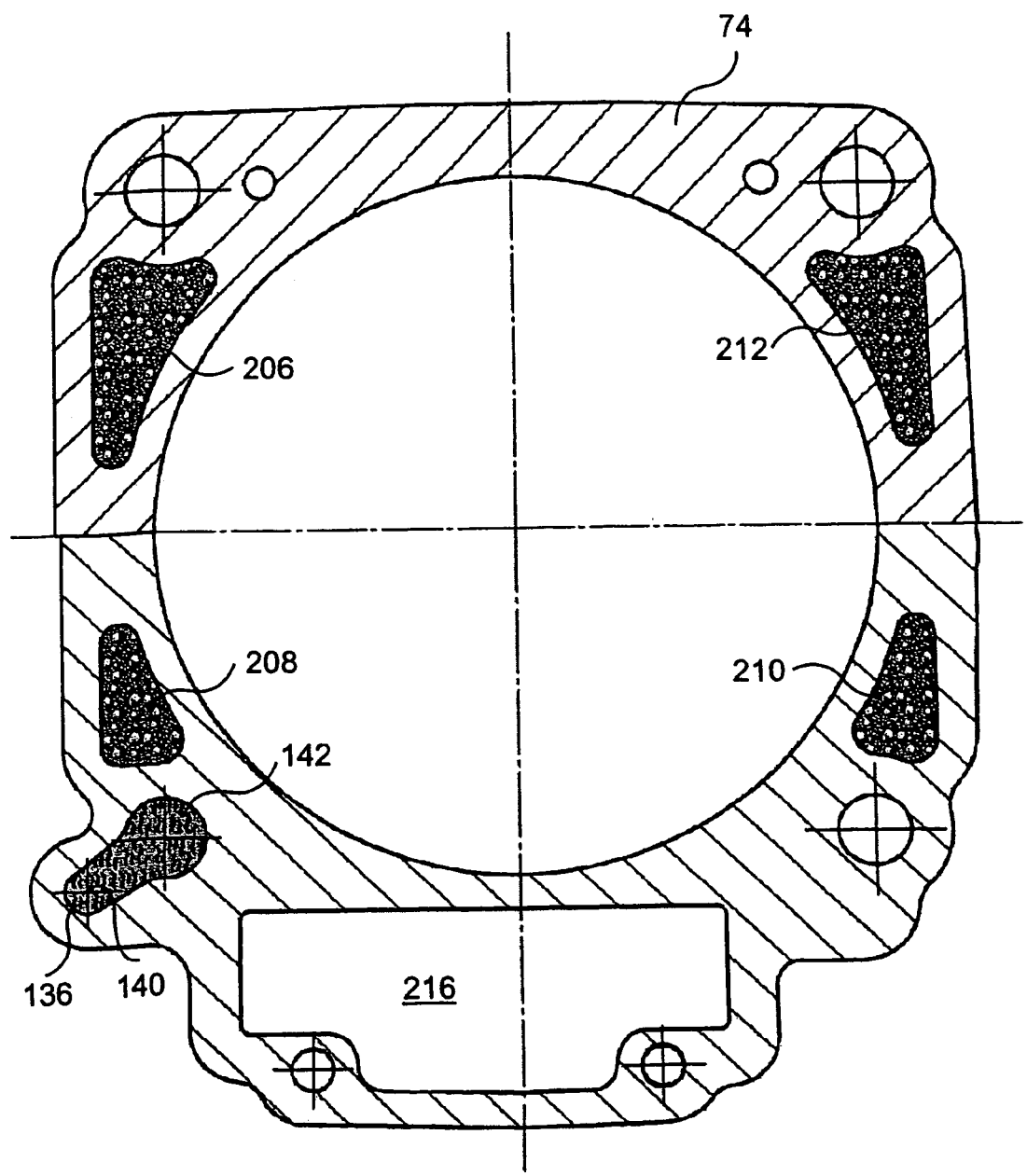
FIG. 10 is a cross-sectional view of a portion of the engine of the present invention taken along the line 10—10 in FIG. 9.

As illustrated in FIG. 10, the crankcase 74 preferably contains four separate passageways 206, 208, 210, 212. The water rises through the passageways 206, 208, 210, 212 until it fills the cooling water jacket 214 that surrounds the cylinder 134 in the cylinder block 132, as illustrated in FIG. 11.

Figure 11:
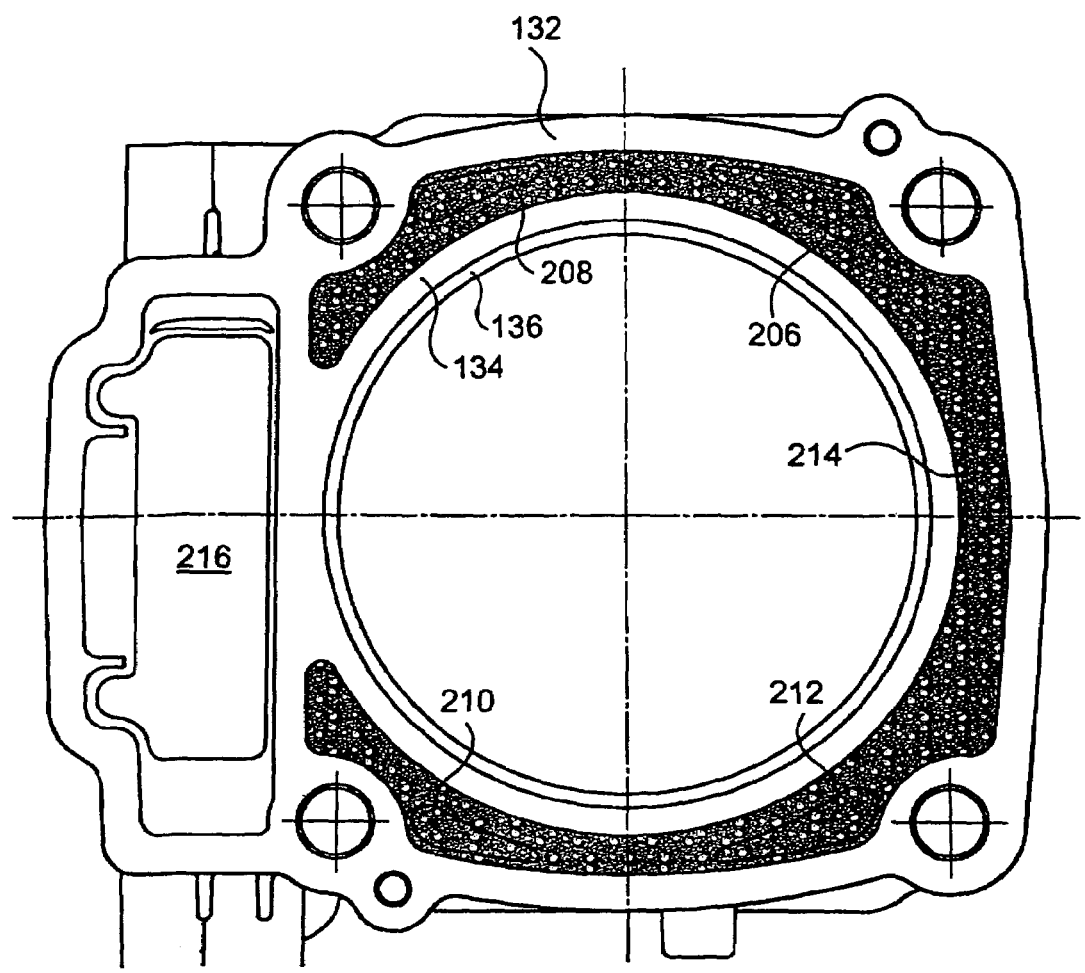
FIG. 11 is a cross-sectional view of a portion of the engine of the present invention taken along the line 11—11 in FIG. 9.

As shown in FIG. 11, the cylinder block 132 has an open-deck construction. This means that water flows spirally around the cylinder 134 in the jacket 214, which nearly encircles the entire circumference of the cylinder 134. The only portion of the cylinder 134 not surrounded by the water jacket 214 is the portion containing the timing chain passage 216. It should be noted, however, that the water jacket 214 may take any suitable shape around the cylinder 134 to affect proper cooling of the cylinder 134 and cylinder liner 136.

A cylinder head gasket 218 is positioned between the cylinder block 132 and the cylinder head 146 to provide a sufficient seal between the two sections of the engine 10. The gasket 218 is provided with a number of holes therethrough to permit the water to flow from the cylinder block 132 to the cylinder head 146.

While not shown, the holes in the gasket 218 have a predetermined cross-sectional area and act as throttles. The holes adjust the quantity and flow pattern of the water passing therethrough. In particular, the holes in the gasket 218 are positioned and designed to provide a greater amount of water flow on the side of the engine 10 with the exhaust passages 204 than the intake side 22 of the engine 10. In this manner, the exhaust side 24 of the engine 10 receives a greater amount of cooling than the intake side 22. Since water flow is greater on the exhaust side 24 of the engine 10, the water flows from the exhaust side 24 to the intake side 22 of the engine 10. Accordingly, the water first cools the exhaust valve stems 220 before cooling the intake valve stems 222. After the water cools the intake valve stems 222, the water exits from the engine 10 through an outlet 224, which is illustrated in FIG. 4. From the outlet 224, the water returns to the heat exchanger (e.g., a radiator) where it is cooled before returning to the water pump 190. Before leaving the cylinder head 146, the water passes a thermostat 224 and a sensor 226, which monitors the water temperature. The thermostat 224 opens when the water temperature 226 exceeds a given threshold.

Optionally, while not the preferred embodiment for the present invention, the water cooling system may be omitted altogether. With such a design, the engine 10 may be cooled by air. Since, with the low speeds of ATVs, air cooling is not usually sufficient to maintain the engine at an appropriate temperature, an air stream may be directed from the CVT 26 to the cylinder 134 and cylinder head 146.

8. The Starting Mechanism

Figure 19:
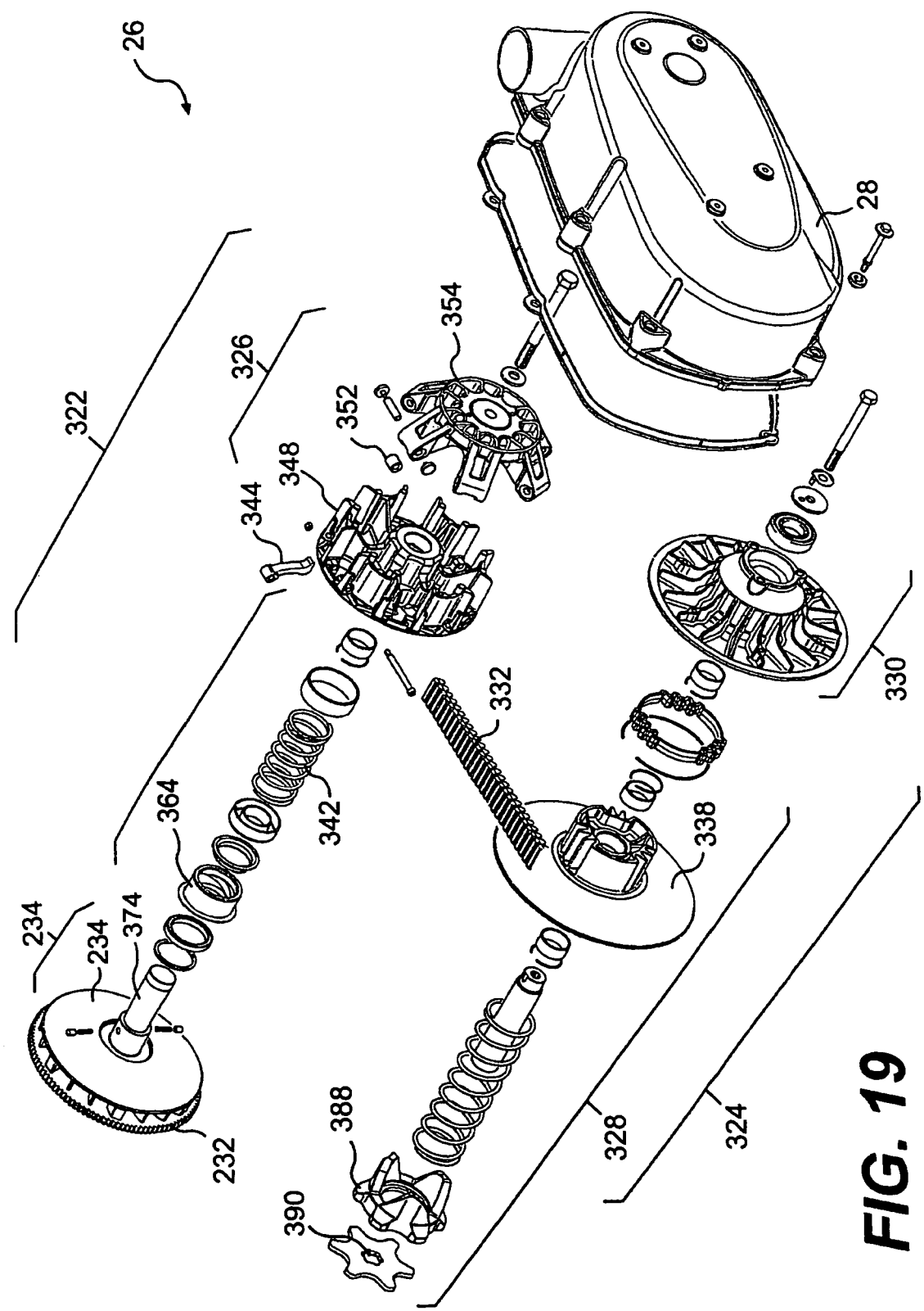
FIG. 19 is an exploded, perspective illustration of the continuously variable transmission of the engine of the present invention.

It is preferred that the engine 10 of the present invention be started using a starter motor 230, the location of which is illustrated in FIG. 4. Preferably, the starter motor 230 is connected to the engine 10 via a drive gear (not shown), which drives an intermediate gear/Bendix drive assembly (not shown). The intermediate gear, in turn, drives a starter gear 232, which is illustrated in FIG. 19.

Figure 20:
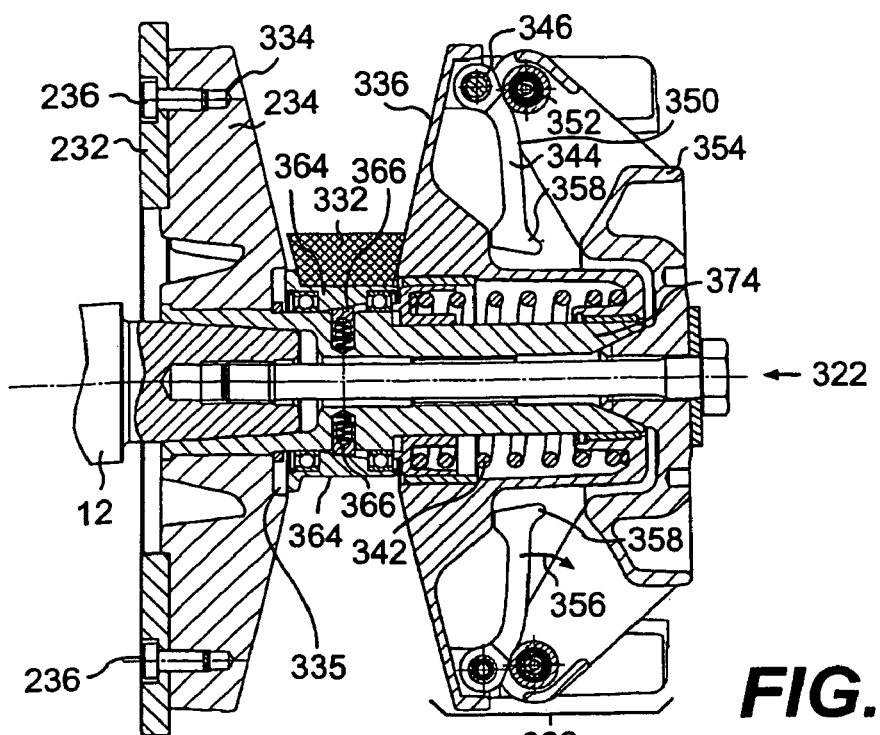
FIG. 20 is a cross-sectional side view illustration of the drive pulley of the CVT in a state where the engine is operating at low speed.

The starter gear 232 is incorporated as a part of the inward half of the drive pulley 234 of the CVT 26, which is described in greater detail below in connection with the CVT 26. The starter gear 232 preferably is connected to the drive pulley inner half 234 by screws 236, as illustrated in FIG. 20. The starter gear 232 forms the inner most side of the drive pulley inner half 234 such that the inner side of the drive pulley inner half 234 is partially closed. Since the drive pulley inner half 234 acts as a fan to cool the components of the CVT 26, using the starter gear 232 to partially close the inner side of the drive pulley inner half 234 increases air circulation within the CVT. As a result, all of the components beneath the CVT cover 28 receive a more pronounced air-cooling.

In addition, the weight of the starter gear 232 is preferably arranged so that the starter gear 232 is a ring gear. This helps to increase the inertia of the crankshaft 12. Because of this, the starter gear 232 serves as a flywheel for the crankshaft 12. The starter gear 232 also may be provided with balancing holes during the manufacture of the CVT 26. In particular, to assure proper balancing between the drive pulley 322 and the crankshaft 12, weight may be removed from the starter gear 232 in specific locations. The weight balance, therefore, may differ from engine 10 to engine 10 depending on the conditions surrounding the manufacture of the engine.

Since the engine 10 of the present invention is designed for use on an ATV 16, it is likely that the ATV 16 will be driven to locations remote from assistance. Accordingly, one design consideration is the provision of alternative means for starting the engine 10, should the starter motor 230 fail.

As a redundant feature added to the starting system of the engine 10, a cable pull starter 66 also may be provided, as illustrated in FIG. 1. Preferably, the cable pul starter 66 is mounted outwardly of the generator 40. The central shaft 238 of the pull starter 66 operatively connects to the crankshaft 12 to impart rotational motion from the pull starter 66 to the crankshaft 12.

In addition, as illustrated in FIGS. 12 and 13, the engine 10 of the present invention may be provided with a manually-operated spring starter 240. In the preferred embodiment of the present invention that includes the spring starter 240, the spring starter 240 is affixed to the generator 40 of the engine 10. The spring starter 240 includes a housing 242 with a central shaft 244. A spring 246 is wrapped around the central shaft 244 and, for the most part, remains in a relaxed (or unwound) condition, as shown in FIGS. 12 and 13. The spring starter 240 is provided with a hand crank 248 with a connecting pin 250, which engages a receiving hole 252 in the central shaft 244.

To start the engine 10, the connecting pin 250 of the hand crank 248 is inserted into the receiving hole 252. Then, the hand crank 248 is rotated in the direction of arrow 254 to wind the spring 246. When the spring 246 is sufficiently wound, the energy stored in the spring 46 may be released to assist the operator in starting the engine 10. While the spring starter 240 may be used by itself, it is preferred that the spring starter 240 be used in combination with either the starter motor 230 or the pull starter 66. If used with the starter motor 230, the spring starter will have the configuration illustrated in FIG. 12. Namely, the spring starter 240 will be mounted on the generator 40. If the engine 10 is provided with a pull starter 66, as illustrated in FIG. 1, the spring starter 240 may be positioned between the generator 40 and the pull starter 66. Alternatively, the spring starter 240 may be positioned outwardly from the pull starter 66.

The actual positioning of the spring starter 240 is not relevant to the present invention. The spring starter 240 may be provided to assist in starting the engine 10 under at least two separate conditions. The first is where the starter motor 230 does not provide sufficient torque to turn the engine 10 over. It is believed that this may occur when the operator attempts to start the engine 10 at low temperatures. The second is where the engine 10 is provided with a pull starter 66 and the operator is not strong enough to start the engine 10 with the pull starter 66. In either case, the spring starter 240 will store a sufficient amount of energy to assist in starting the engine 10.

As discussed above, the spring starter 240 preferably is designed to assist in starting the engine 10. As such, only a substantially slightly greater energy must be applied to set the engine into motion than would be applied without the spring starter 240. Accordingly, the spring 246 is dimensioned and biased such that the piston 38 and the spring 246 counterbalance each other slightly before the upper dead center position of the piston 238.

In still another alternative embodiment, it is contemplated that the spring starter 240 could be designed to start the engine 10. In such a case, the spring starter would act as the starter for the engine 10 and not as an assistance to the starting of the engine 10.

A further development (in ATVs) for facilitating starting of the engine (especially cold start) is the "decompressor" 256 illustrated in FIGS. 14-18. As shown in cross-section in FIG. 16, the decompressor 256 is mounted on the camshaft timing chain gear 56.

The decompressor comprises two main components, a centrifugal weight 258 and a pin 260, the so-called "deco"-axle. During a standstill and at a low number of revolutions (below idle speed) of the engine 10, the pin 260 is in a position where its tip 262 is inserted in the direction of the camshaft 58, away from the camshaft timing chain gear 56. When in this position, the tip 262 projects radially over the base circle of the first cam. During rotation of the camshaft 58, the tip 262 forces the associated rocker arm 176 to move over the "deco"-axle 260 so that the rocker arm 176 is pivoted an additional upward distance on the rocker arm axle 148. Because of the additional movement of the rocker arm 176, the associated valve remains opened for a slightly longer period. Since the valve is opened during compression for a slightly longer period, compression within the cylinder 134 is reduced and the engine 10 can be started with substantially greater ease.

The deco-axle 260, however, does not remain in the decompression position during all engine speeds. To the contrary, once the engine speed (in revolutions per minute or rpm's) exceeds a predetermined amount, the centrifugal weight 258 swings radially outward about its pivot axis 264. The motion of the centrifugal weight 258 is best illustrated in FIG. 18.

As shown in FIG. 18, at low engine speeds, the centrifugal weight 258 remains in its initial position 268, which is illustrated in dotted lines. As the speed of the engine 10 increases, however, the centrifugal weight 258 shifts outwardly about its axis 264 to its final position 270, which is shown in solid lines.

Figure 14:
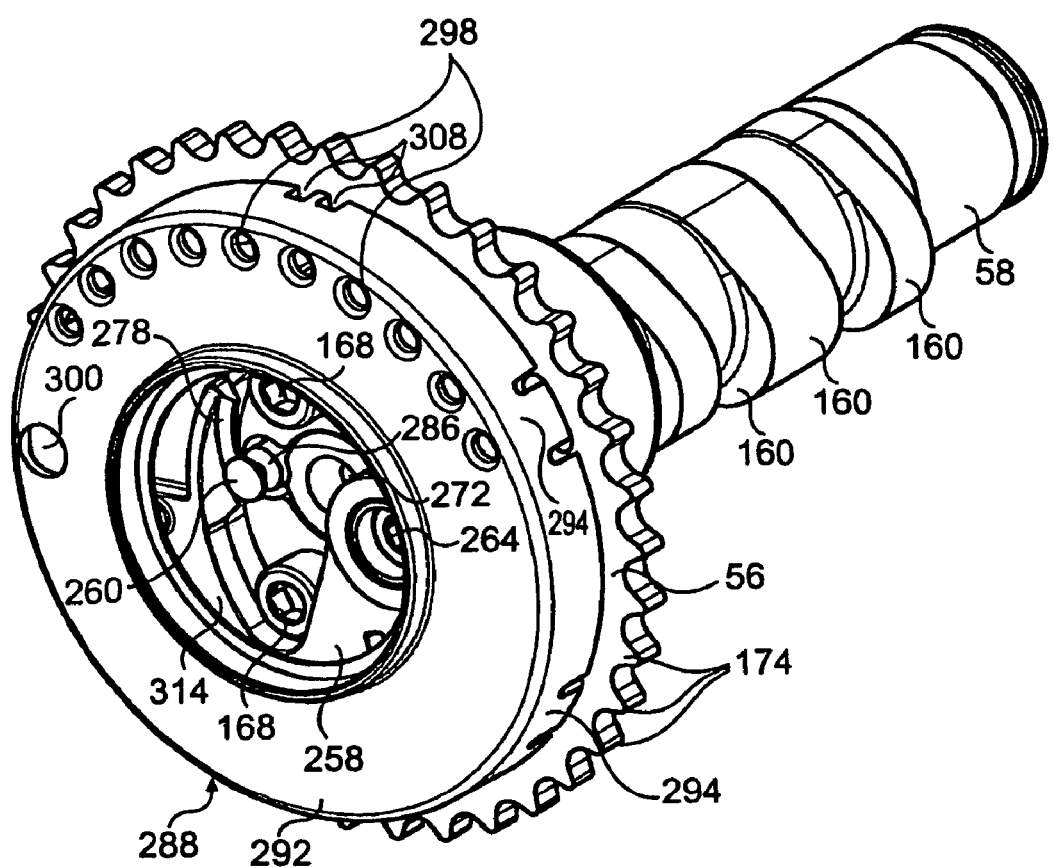
FIG. 14 is a perspective illustration of the combined blow-by gas oil separator and camshaft of the engine of the present invention.
Figure 15:
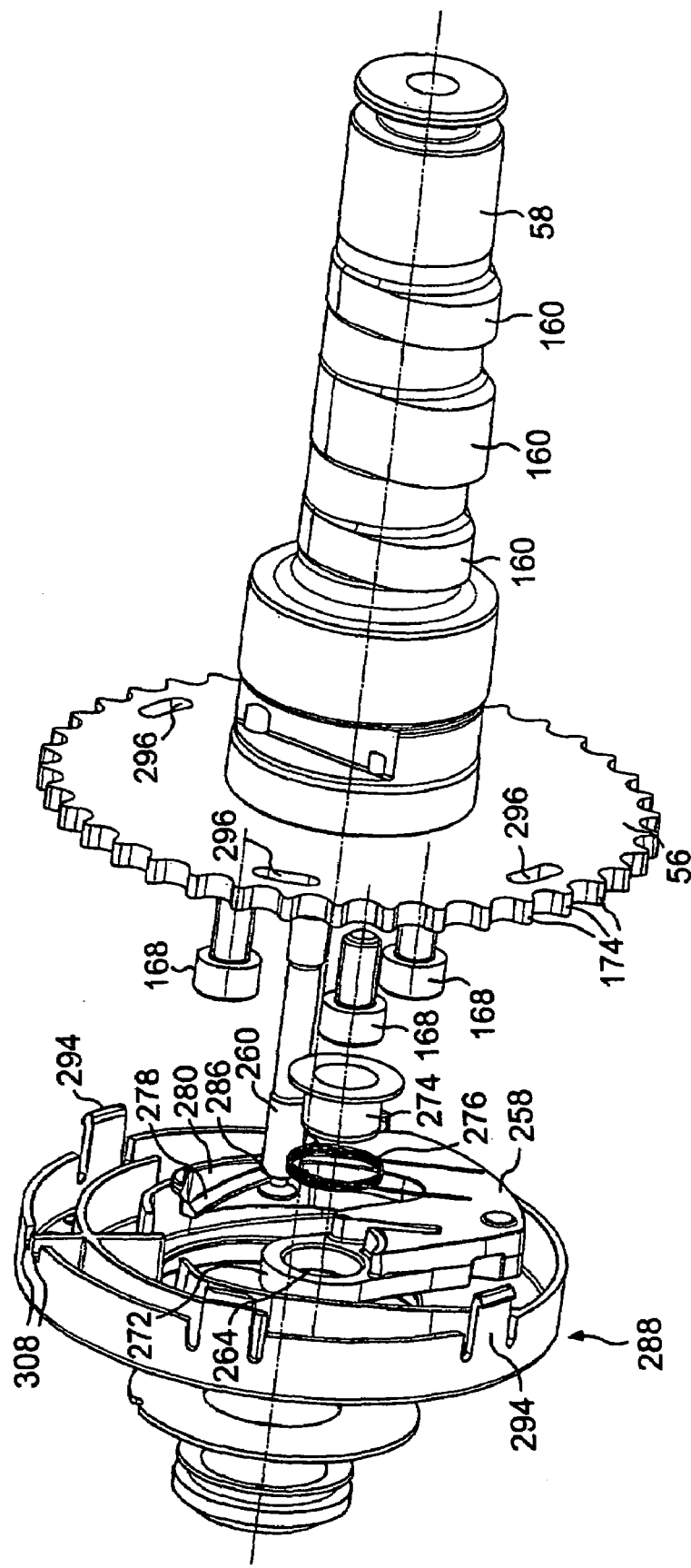
FIG. 15 is an exploded perspective illustration of the blow-by gas oil separator and camshaft shown in FIG. 14.

The centrifugal weight 258 is pivotally mounted to the camshaft timing chain gear 56. Specifically, the centrifugal weight 258 is manufactured with a circular opening 272 that mates with a flange 274 that pivotally slips over the outside surface of one of the screws 168 that connect the camshaft timing chain gear 56 to the camshaft 58, as illustrated in FIGS. 14 and 15. The centrifugal weight 258 is biased in the initial position 268 by a spring 276. The spring 276 provides a sufficient amount of biasing force to maintian the centrifugal weight 258 in the initial position 268 until the speed of the engine 10 exceeds a predetermined threshhold amount.

The centrifugal weight is provided with an elongated tooth 278 on an inner surface 280 thereof. As shown in FIG. 17, the elongated tooth 278 extends substantially from a first side 282 to a second side 284 of the centrifugal weight 258. The elongated tooth engages a groove 286 on the deco-axle 260. As the centrifugal weight 258 moves from the initial position 268 to the final position 270, the elongated tooth 278 applies a force on the deco-axle 260 that forcibly pulls the tip 262 of the deco axle 260 toward the camshaft timing chain gear 56. In this manner, the tip 262 of the deco-axle 260 is withdrawn from the base circle of the first cam. Accordingly, the deco-axle 260 no longer performs a decompression function and the engine 10 operates according to a "regular" or unmodified compression schedule, which means that the associated valve remains closed in the angular range in question during compression, and the engine 10 compresses the fuel-air mixture as usual. The axial movement of the deco-axle 260 is effected by the special kind of connection between the deco-axle 260 and the centrifugal weight 258. Specifically, the elongated tooth 278 that engages the deco-axle is formed like an inclined plane. As such, the elongated tooth 278 forces an axial stroke as soon as the centrifugal weight 258 moves radially outwardly.

The spring 276 ensures that the centrifugal weight is drawn back to its initial position 268 when the engine speed falls below the predetermined threshhold. Under those conditions, the deco-axle 260 is pushed axially inward so that the decompressor 256 becomes active again. During startup, the decompressor 256 preferably prevents a substantial compression for a few revolutions. In particular, with the present design, the decompressor 256 starts to function ≈38° before the upper dead center position of the piston 38.

9. The Blow-by Gas Oil Separator

FIGS. 14–18 also illustrate a blow-by gas oil separator 288 that is incorporated into the engine 10 of the present invention. The blow-by gas oil separator 288 removes oil from the blow-by gas before the blow-by gas exits the crankcase 74 through a blow-by gas outlet 290 and is directed to the induction system, e.g., to the airbox (not shown).

Figure 16:
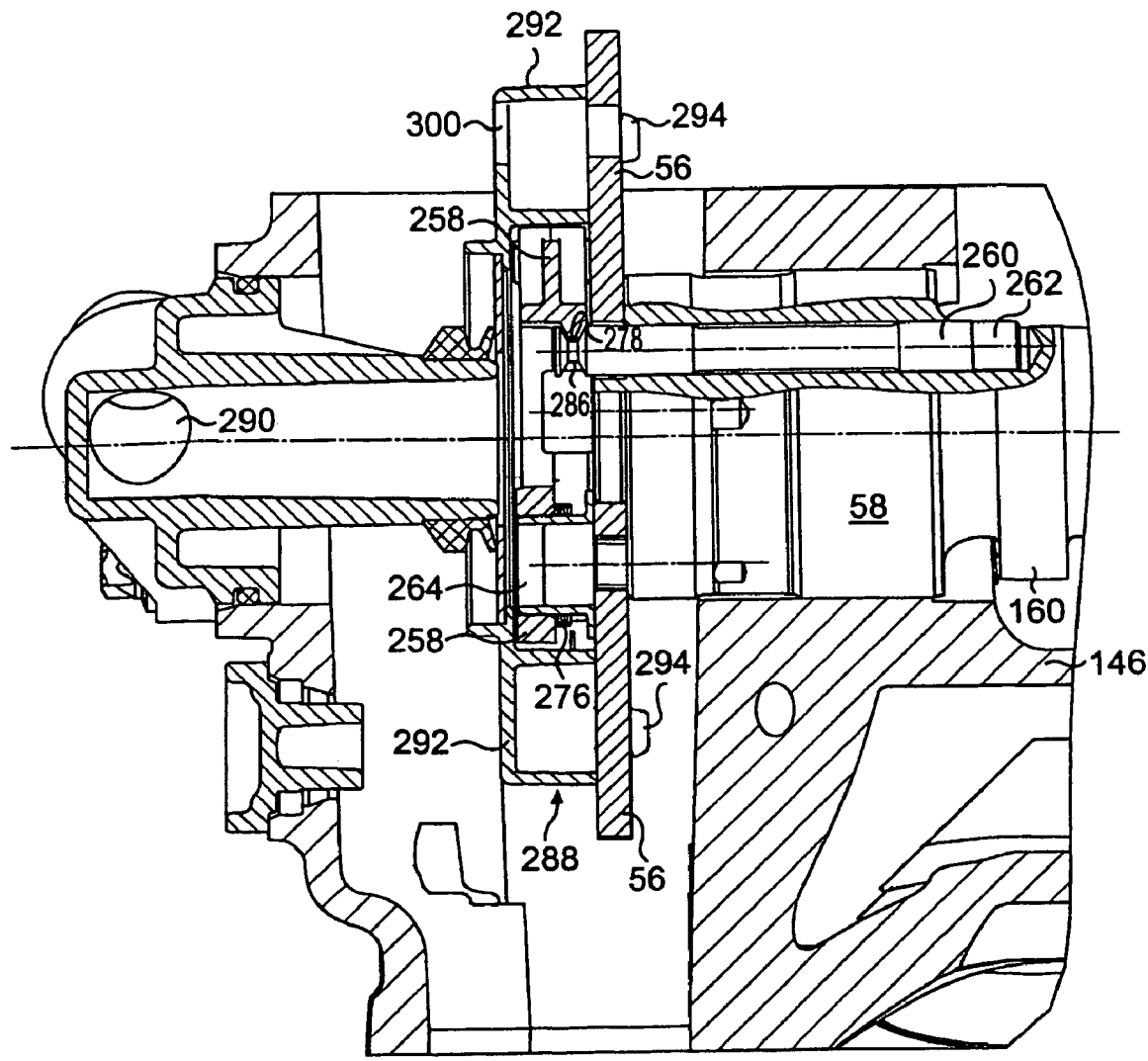
FIG. 16 is an enlarged, cross-sectional side view illustration of a portion of the engine of the present invention, showing the blow-by gas oil separator and a portion of the camshaft.

The blow-by gas separator 288 preferably includes a housing 292 that is provided with several locking tabs 294 about its periphery. The locking tabs 294 extend through locking holes 296 disposed through the camshaft timing chain gear 56, as illustrated in FIG. 16, to engage the rear surface of the camshaft timing chain gear 56. The housing 292 preferably is made from a light-weight material such as plastic. However, as would be appreciated by those skilled in the art, the housing 292 may be made from any other suitable material including metal.

The housing 292 defines a plurality of uniformly-sized holes 298 along part of its outer edge that permit entry of the blow-by gas flowing from within the crankcase 74 to the induction system. The housing also contains a further hole 300 that is larger than the uniformly-sized holes 298. All of the holes 298, 300 act as entry points for the blow-by gas to enter the housing 292. Once inside the blow-by gas separator 288, the blow-by gas, which generally has a very low pressure, is subjected to centrifugal forces because the housing 292 spins in the direction shown by arrow 302. Due to centrifugal forces, the oil in the blow-by gas, which is in the form of very fine droplets, separates from the blow-by gas and impacts against the inner wall 304 of the housing 292. The oil then tends to travel along the inner wall 304 in the direction indicated by arrow 306 such that the oil flows toward the holes 298. The oil drains from the housing through the holes 298 and also through oil drain ports 308 provided through the side of the housing 292.

The interior of the housing 292 is provided with a labrynthine construction to delay the blow-by gas therein for a sufficiently long time to centrifuge substantially all of the oil from the gas. The labrynthine construction is illustrated best in FIG. 18. In particular, the housing includes a radial separating wall 310 extending from the side wall 312 toward the central opening 314 in the housing 292. A circumferential separating wall 316 extends partially along the interior of the housing at a position radially inward of the holes 298. Two side separating walls 318 extend from the side wall 312 and extend toward the radial separating wall 310. Together, the walls 310, 316, 318 define the labrynthine path for the blow-by gas, which is indicated by arrow 320.

The labrynthine path 320 through the housing 292 ensures that a majority, if not substantially all, of the oil is removed from the blow-by gas before the gas exits the crankcase 74 through the outlet 290.

The housing 292 is designed to by symmetrical about the radial separating wall 310. So designed, the housing 292 could be adapted to be used on an engine that rotates in a direction opposite to the rotation direction 302. Also, beause of its symmetrical construction, the housing 292 may be employed on a V-type engine where the camshafts rotate in directions opposite to one another during operation.

10. The CVT (Continuously Variable Transmission)

The CVT 26 of the present invention is illustrated in FIGS. 19–33. The CVT 26 comprises a drive pulley 322 and a driven pulley 324. Both the drive pulley 322 and the driven pulley 324 have inner and outer halves. The inner half of the drive pulley is designated 234. The outer half of the drive pulley is designated 326. The driven pulley inner half is designated 328 while the outer half is designated 330.

Since the drive pulley 322 is connected to the crankshaft 12 as illustrated in FIG. 1, torque is transmitted from the crankshaft 12 to the drive pulley 322. A belt 332 connects the drive pulley 322 to the driven pulley 324, permitting the torque to be transmitted to the driven pulley 324.

Figure 21:
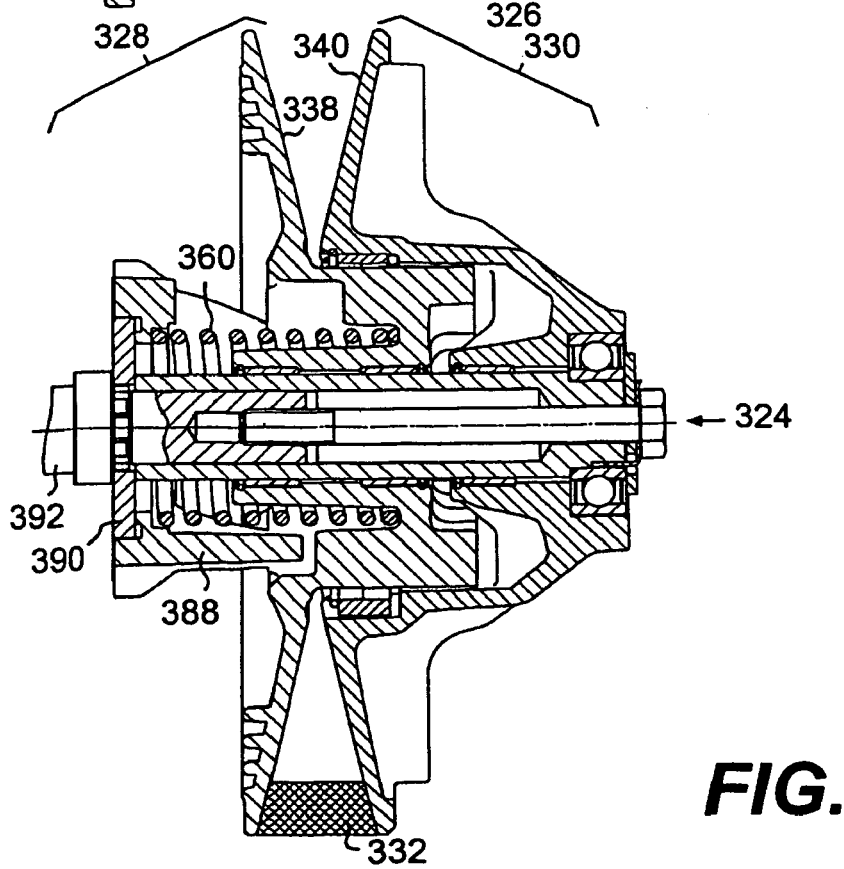
FIG. 21 is a cross-sectional side view illustration of the driven pulley of the CVT in a state where the engine is operating at low speed.
Figure 22:
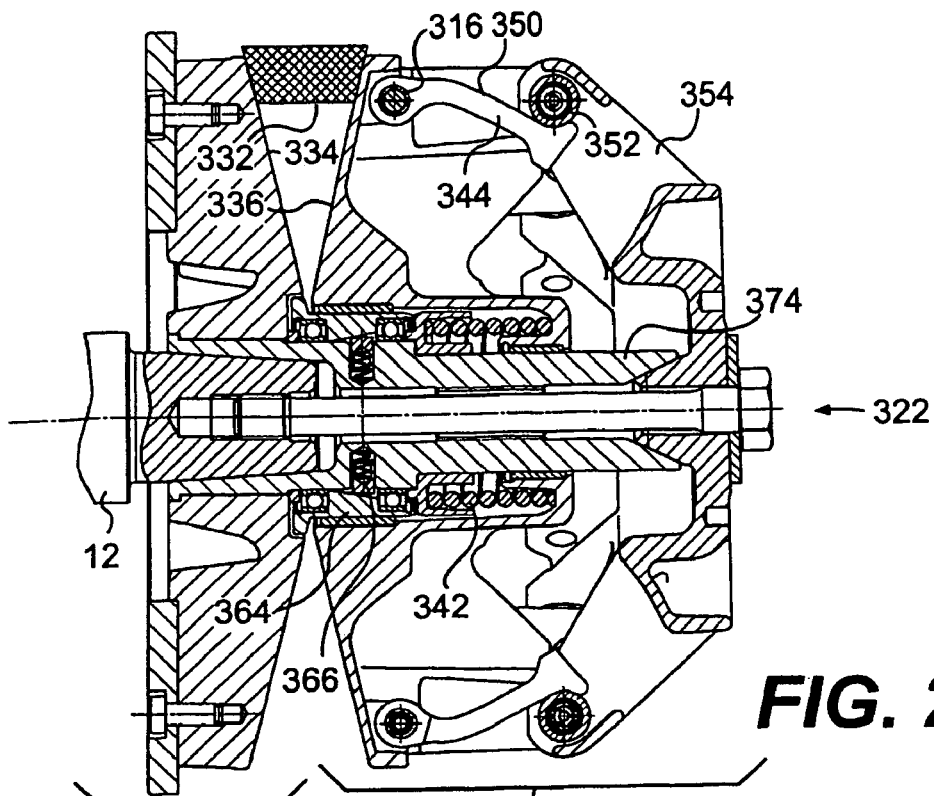
FIG. 22 is a cross-sectional side view illustration of the drive pulley of the CVT in a state where the engine is operating at high speed.
Figure 23:
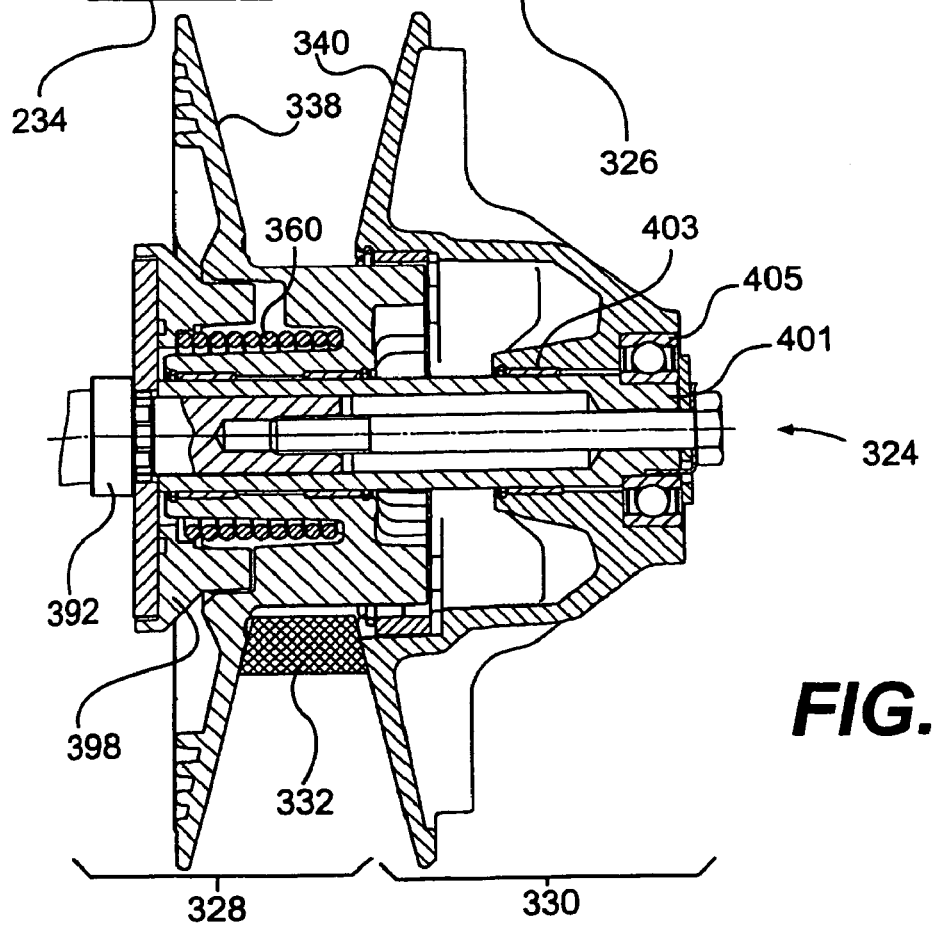
FIG. 23 is a cross-sectional side view illustration of the driven pulley of the CVT in a state where the engine is operating at high speed.

FIGS. 20 and 21 illustrate the positions of the drive pulley 322, the driven pulley 324, and the belt 332 when the engine 10 is operating at a low engine speed. FIGS. 22 and 23 illustrate the respective positions of the drive pulley 322, driven pulley 324 and belt 332 when the engine 10 is operating at high engine speeds. Any intermediate positons between these extremes would indicate that the engine 10 is operating at an intermediate speed.

The CVT 26 operates in the following manner.

The drive pulley inner half 234 is provided with a belt engagement surface 334. The drive pulley outer half 326 is provided with a belt engagement surface 336. Similarly, the driven pulley inner half 328 includes a belt engagement surface 338. Finally, the driven pulley outer half 330 includes a belt engagement surface 340. The belt 332 extends between the drive pulley 322 and the driven pulley 324 and, during operation, predominantly engages the belt engagement surfaces 334, 336 and 338, 340, respectively. The belt 332 transfers the torque of the engine 10 from the drive pulley 322 to the driven pulley 324.

The drive pulley inner half 234 includes the starter gear 232, which is connected thereto via one or m re screws 236. The drive pulley inner half 234 is connected to the crankshaft 12. The drive pulley outer half 326 is biased by a drive pulley spring 342 away from the drive pulley inner half 234 when the engine 10 operates at low speeds.

The drive pulley outer half 326 is provided with a number of centrifugal weights 344 that are mounted to pivot axes 346 disposed about the periphery of the rear surface of the drive pulley outer plate member 346. The outward surfaces 350 of the centrifugal weights rest against rollers 352 on the drive pulley roller member 354.

The drive pulley spring 342 exerts sufficient force on the drive pulley outer half 326 to force the outer half 326 away from the inner half 234. In particular, the drive pulley spring 346 exerts its force on the outer plate member 348. The centrifugal weights 344 on the outer plate member 348, in turn, contact the roller member 354. Due to the force exerted by the drive spring 346, the centrifugal weights 344 are in constant engagement with the rollers 352. The force of the drive spring 346 biases the outer half 326 of the drive pulley 322 away from the inner half 234, as shown in cross-section in FIG. 20.

At low engine speeds, the inner half 234 and the outer half 326 of the drive pulley 322 are positioned as illustrated in FIG. 20. However, at high speeds, the halves 234, 326 take the positions shown in FIG. 22. The centrifugal weights 344 are instrumental in making this transitional change. In particular, as the rotation speed of the drive pulley 322 increases, the centrifugal force on the centrifugal weights 344 becomes sufficiently high that the centrifugal weights 344 begin to swing outwardly in the direction of arrow 356. The greater the rotational speed, the greater the outward swing of the weights 344 until the weights 344 reach their maximum outward swing and the rollers 352 rest against the stops 358 on the centrifugal weights 344. The maximum swing position is illustrated in FIG. 22.

As the centrifugal weights 344 swing outwardly, their outer surfaces 350 press against the rollers 352. This causes the drive pulley outer plate member 346 and the roller member 354 to separate from one another, collapsing the drive spring 342. As a result, the belt engagement surface 334, 336 move toward one another. Since the belt 332 is angled to ride on the belt engagement surfaces 334, 336, and since it is effectively incompressible (albeit elastic), the belt 332 travels outwardly from the inner position shown in FIG. 20 to the outer position illustrated in FIG. 22.

Since the tension on the drive belt 322 must remain constant regardless of the position of the belt 322 in the CVT 26, the driven pulley 324 acts in a manner opposite to that of the drive pulley 322. In particular, the driven pulley 324 includes a driven spring 360 that forces the inner half of the driven pulley 328 toward the outer half of the driven pulley 330 in the rest (or low speed) condition. Therefore, when the engine 10 operates at a low speed, the inner and outer halves 328, 330 of the driven pulley 324 are at their closest point to one another, as illustrated in FIG. 21.

When the engine 10 is operating at high speed, however, the tension on the belt 332, which must remain constant to avoid breakage of the belt 332, causes the inner and outer halves of the driven pulley 324 to separate. Accordingly, the belt 332 travels from its highest point as shown in FIG. 21 to its lowest point, as illustrated in FIG. 23.

The CVT 26 of the present invention differs from the prior art is several respects. First, the CVT 26 is designed so that it is possible to equip the ATV 16 with a brake assembly that may be engaged while the engine 10 is operating. The brake assembly 362 is illustrated in FIGS. 34–39, below and is discussed in greater detail in connection with those drawings below. Second, the CVT 26 is designed so that the ATV 16 may be towed or pushed so that the transmission can be used to start the engine 10. In both cases, the direction of the transmitted torque is changed from a positive direction (where the engine 10 drives the vehicle) to a negative direction (where the wheels 18, 20 drive the engine 10 or the engine 10 brakes the vehicle). The latter condition (i.e., the negative direction) will be referred to as a "reverse torque transmission" mode or a "RTT" mode in the description that follows.

Prior art CVTs with a RTT are known. These prior art CTVs, however, rely on conventional CVT design parameters. One example of such a CVT is made by Polaris, a snowmobile manufacturer located the United States. Polaris's snowmobile incorporates a CVT based on a poly-V-section belt/drive pulley combined with a conventional freewheel and clutch unit. The poly-V-section belt and pulley engage one another when the belt is in the low speed position on the drive pulley (analogous to the position illustrated in FIG. 20). This design, however, has at least one significant drawback. The elastic belt become significantly worn when it engages the pulley section and thus tends to fray, thereby greatly reducing its useful life.

To overcome difficulties such as these, and to provide the ability to brake the ATV 16 when the engine 10 is operating, and to provide a RTT, a mechanism to permit free wheel operation was developed for the CVT 26 of the present invention. In particular, the CVT 26 of the present invention incorporates a slide sleeve 364 on the drive pulley 322. The slide sleeve 364 cooperates with one or more spring loaded pins 366 to affect its operation. An enlarged view of the slide sleeve 364 construction is provided in FIG. 24.

The slide sleeve 364 has two modes of operation. The first is the non-engaged mode where the slide sleeve 364 permits the inner and outer halves 234, 326 of the drive gear 322 to rotate without imparting any torque to the belt 332. This operational position is illustrated in FIG. 21. The second operational mode permits the CVT 26 to act as a RTT to impart torque from the wheels 18, 20 of the ATV 16 to the engine 10.

Figure 24:
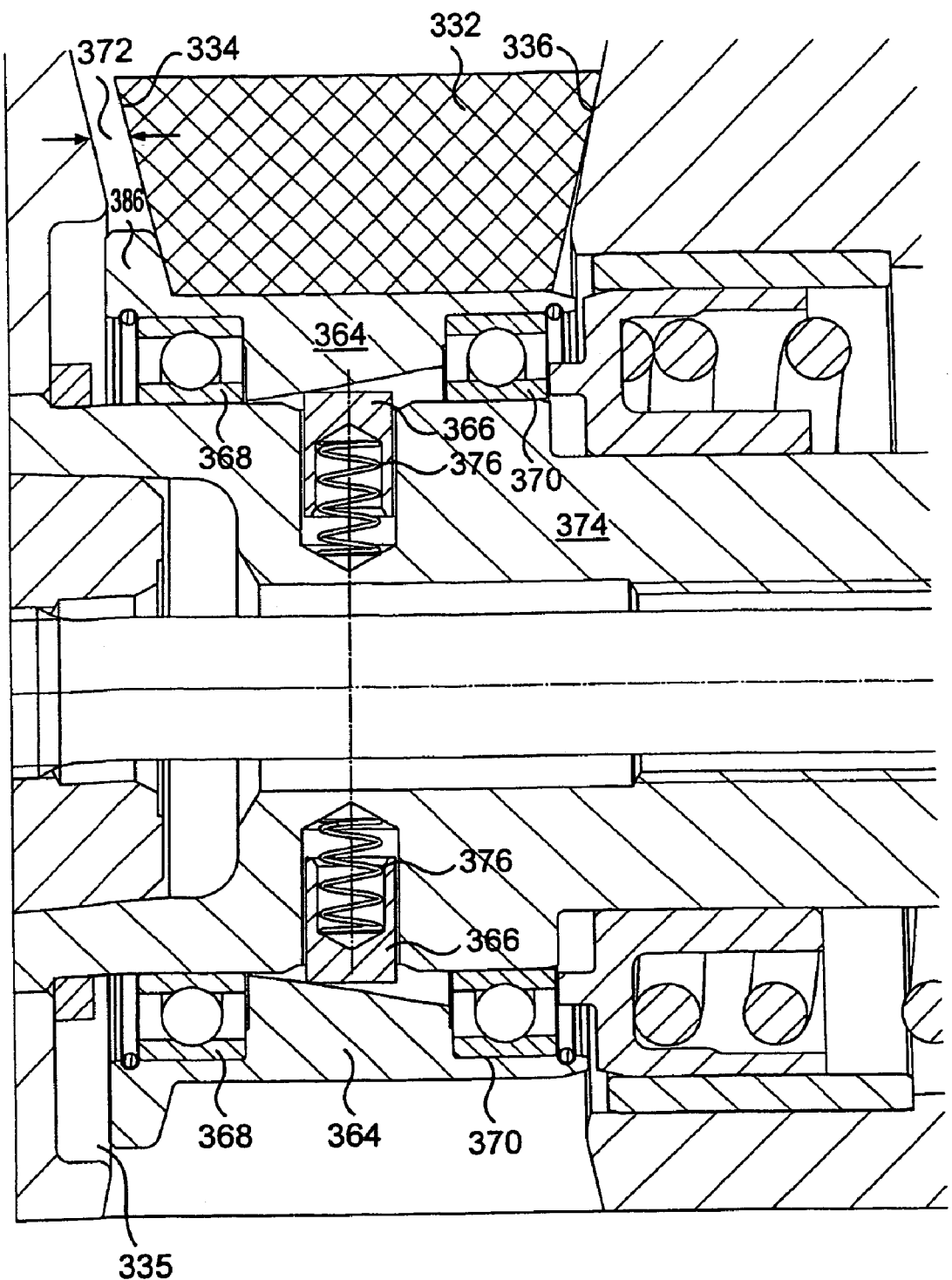
FIG. 24 is an enlarged cross-sectional view of a portion of the drive pulley of the CVT in a state where the engine is operating at low speed.

To permit free rotation of the slide sleeve 364, the sleeve 364 is journaled by two anitfriction bearings 368, 370 on shaft 374. In operation, when the engine 10 is operating at low speeds, the belt 332 engages the slide sleeve 364. At low operational speeds of the engine 10, the inner and outer halves 234, 326 of the drive pulley 322 do not clamp the belt between them. In fact, as illustrated in FIGS. 21 and 24, while the belt 332 is shown as abutting the belt engagement surface 336, there is a gap 372 at least between the belt and the inner half 234 of the drive pulley 322. Preferably, a gap also exists between the belt 332 and the belt engagement surface 336. Accordingly, the slide sleeve 364 is permitted to float on the underlying shaft 374 while the inner and outer halves 234, 326 of the drive pulley 322 rotate. More accurately, the shaft 374 rotates beneath the slide sleeve 364. As a result, the slide sleeve 364 and belt 332 are stationary during low speed operation of the engine 10, especially during-idle speed.

When the rotational speed of the engine 10 exceeds a predetermined threshhold, the centrifugal weights 344 begin their outward swing, causing the outer half 326 of the drive pulley 322 to move toward the inner half 234, clamping the belt 332 between them. Once this occurs, torque from the engine 10 is transmitted to the driven pulley 324, where it is transmitted to the wheels 18, 20.

The slide sleeve 364 permits the construction of a brake assembly 362, which may be engaged while the engine 10 is operating. Without the slide sleeve 364, torque from the engine 10 always would be transferred to the CVT 26. As a result, even if the engine 10 were operating at low speeds, the wheels 18, 20 would be encouraged to move and the AVT 16 would have a tendency to creep forward. With the slide sleeve 364, however, the belt 332 does not transfer torque to the driven pulley 324, which means that the ATV 16 does not have a tendency to creep forward. As a result, the brake assembly 362 maybe engaged even while the engine 10 is operating without fear of damage to the brake assembly 362.

So that the slide sleeve 364 also permits the CVT 26 to operate as a RTT, at least one pin 366, but preferably two or more pins 366, biased outwardly with a spring 376, projects from the shaft 374. Preferably, the pin 366 is hexagonally shaped but, as would be understood by those skilled in the art, the pin 366 could take any suitable shape. In particular the pin 366 could be replaced by a ball bearing disposed at the top of the spring 376 so that it engages the inside of the slide sleeve 364.

Figure 25:
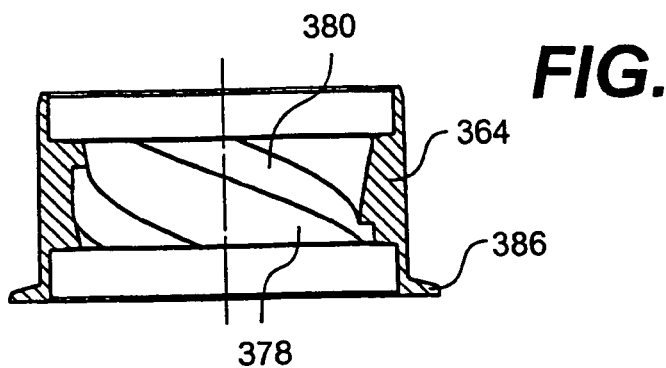
FIG. 25 is a cross-sectional side view illustration of the slide sleeve from the drive pulley of the CVT of the present invention.
Figure 26:
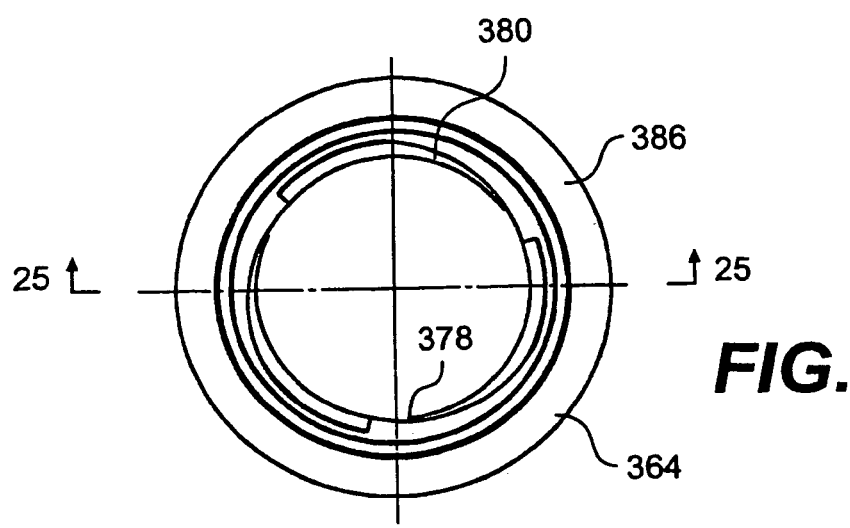
FIG. 26 is a top view of the slide sleeve from the drive pulley of the CVT of the present invention.
Figure 27:
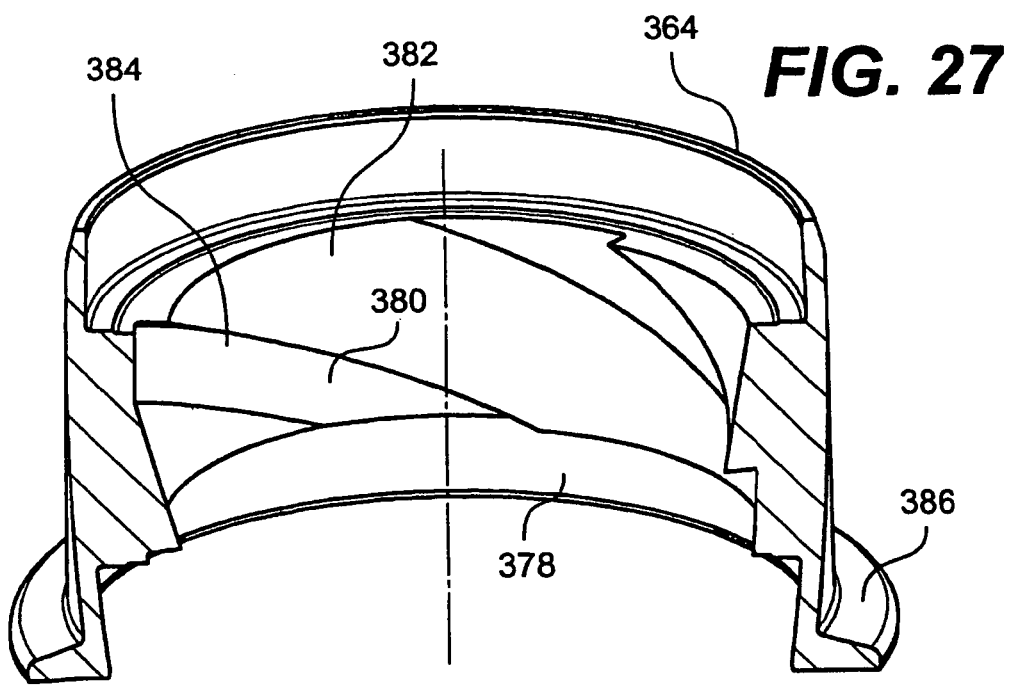
FIG. 27 is a perspective, side-view of the slide sleeve of the drive pulley of the CVT of the present invention.

Various views of the slide sleeve 364 are provided in FIGS. 25–27. These views highlight the construction of the inner surface 378 of the slide sleeve 364, which includes at least one helically-shaped groove 380. As illustrated in FIG. 26, three helically shaped grooves 380 are preferably provided. One pin 366 preferably engages each groove 380.

The grooves are shaped to be shallow 382 in one direction and steep 384 in another. The shallow sides 382 permit the pins 366 to slide over them when the engine 10 operates in the forward direction (positive torque). In other words, the shallow sides 382 of the grooves do not engage the pins 366. Moreover, the shallow sides 382 are shallow enough that the pins 366 generate little noise as they move over the grooves 386 during forward operation of the engine 10.

The steep portions 384 of the grooves 380 permit the slide sleeve 364 to operate as a RTT. In particular, if the AVT 16 is pushed forward so that the torque from the wheels 18, 20 is applied to the slide sleeve 364, the pins 366 will engage the groove 380, hold the slide sleeve 364 stationary with respect to the shaft 374, and, thereby, transfer the torque from the wheels 18, 20 to the engine 10. The shallower guide paths can result in less noise from the pins moving over the guide paths. The number and width of the guide paths can be varied as desired.

In addition, on one side, the slide sleeve 364 includes an annular, flange-shaped end 386 with an external radius larger than that of the remaining portion of the slide sleeve 364. This annular flange 386 serves as catch flank for the elastic belt 332 so as to press it against the outer part 326 of the drive pulley 322 during the RRT-mode, which is illustrated in FIG. 24. The axial pressing effect is achieved by coaction with the spiral grooves 380 and the pins 366. The flange 386 preferably has a minimum height so as to not ride under the belt 332. In addition, the flange 386 preferably has a maximum height so as to not overly reduce the effective belt engagement surface 334 of the drive pulley inner half 234.

As illustrated in FIGS. 20 and 24, the belt engagement surface 334 of the drive pulley inner half 234 includes a recess 335 that accommodates the flange 386. As such, there is a smooth transition as the belt 332 moves outwardly within the drive pulley 322 from the slide sleeve 364.

The drive spring 342 serves one additional function with respect to the slide sleeve 364. On one hand, it serves to enable the starting position of the drive pulley 322 when the engine 10 stands still as illustrated in FIG. 21. On the other hand, it functions to return the catch flank 386 of the slide sleeve 364 into its starting position during normal operation. This prevents the flange 386 from catching the belt 332 as it moves down the drive pulley 322 when the engine speed decreases.

If the engine 10 is started by thrust and the belt 332 is pressed by the flange 386 against the outer pulley part 326 of the drive pulley 322, a connection is made between the pulley halves 234, 326 and the elastic belt 332 via the flank sides of the belt 332. The minimum coupling speed can be designed into the CVT 26 so that the belt 332 must move at a sufficient speed before the RTT mode will engage. Once engaged, as the speed of the belt 332 (or number of revolutions of the drive pulley 322) increases, the centrifugal weights 344 will move outwardly. This will cause the drive pulley outer plate member 348 to move inwardly, clamping the belt 332 between the belt engaging surfaces 334, 336.

During normal operation (e.g., non-RTT operation), it is preferred to maintain as constant a tension in the elastic belt 332 as possible, because a constant tension will ensure satisfactory torque transmission from the drive pulley 322 to the driven pulley 324. The driven pulley 324 assures that the tension on the belt 332 remains constant. The inner half 328 of the driven pulley 324 is instrumental here.

Figure 28:
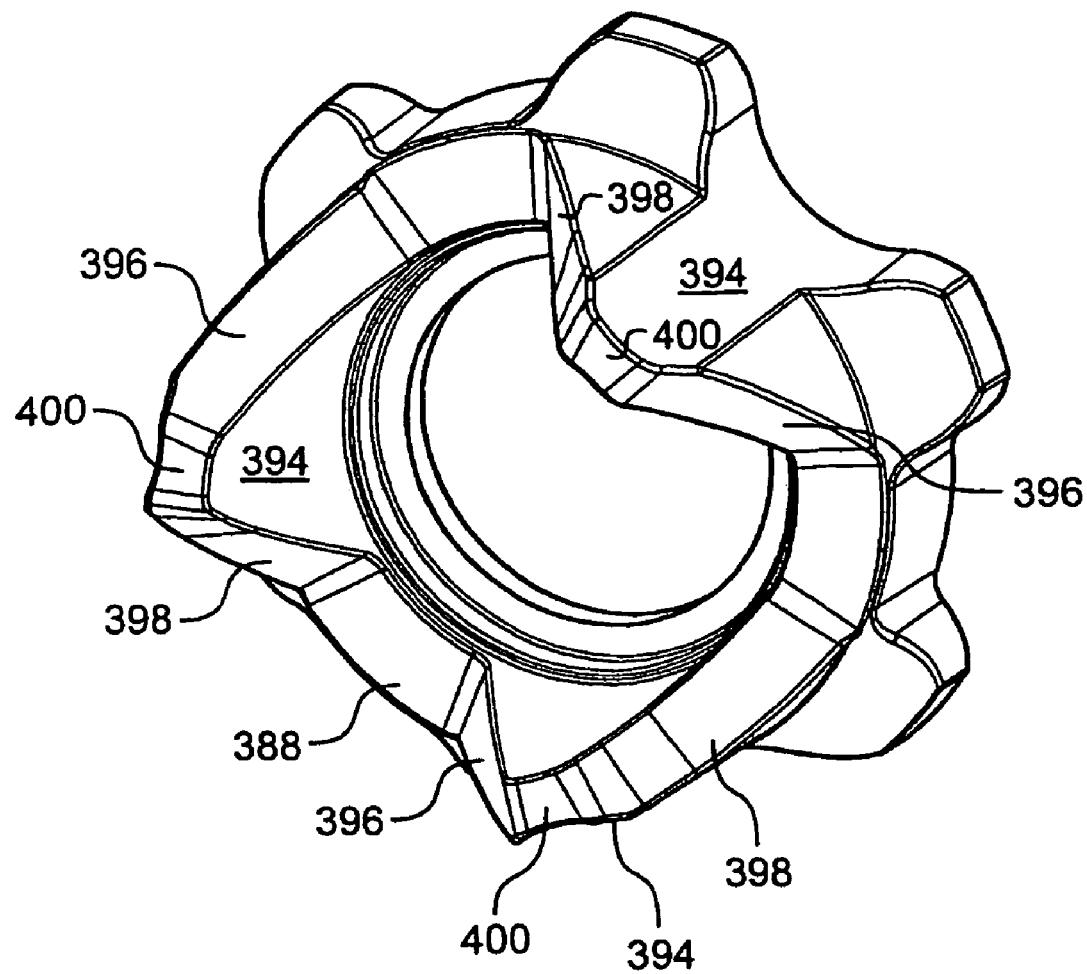
FIG. 28 is a perspective illustration of the guide member element of the driven pulley of the CVT of the present invention.

The inner half 328 of the driven pulley 324 includes a guide member 388. The guide member 388 is illustrated in greater detail in FIG. 28. The guide member 388 engages with a toothed wheel 390, which is fixedly connected to the driven-side axle 392. The guide member 388 and the inner half 328 of the driven pulley 324 are mutually engaged via projections 394. As illustrated in FIG. 28, three two-sided projections 394 are preferred for guide member 388. However, as would be understood by those skilled in the art, any number of projections 394 may be employed. The projections 394 enable the guide member 388 and the inner half 328 of the driven pulley 324 to slide into each other and to slide apart from one another during operation.

Each of the projections 394 include a normal operation ramp 396 and a RTT operation ramp 398, which are engaged alternatively depending on the operation of the CVT 26. The shapes of the ramps 396, 398 are designed for each of the two operation types. In particular, the normal operation ramps 396 are given a steep slope. The RTT ramps 398, however, are not given as steep a slope as the normal operation ramps 396. The outer ends (the flank region) of the projections 394 are designed to be flat, which helps to maintain the tension in the belt 332 approximately constant, e.g., when the vehicle is pushed or towed to start the engine 10 (RTT mode of operation). The flat portions 400 of the RTT ramps 398 increase the force applied by the inner half 328 to the outer half 330, thereby compensating for the lack of force (or reduced force) applied by the expanded driven spring 360 and the inactive centrifugal weights 344. The flat portion 400 of the projections 394 preferably are provided with approximately a 15° inclination.

Figure 31:
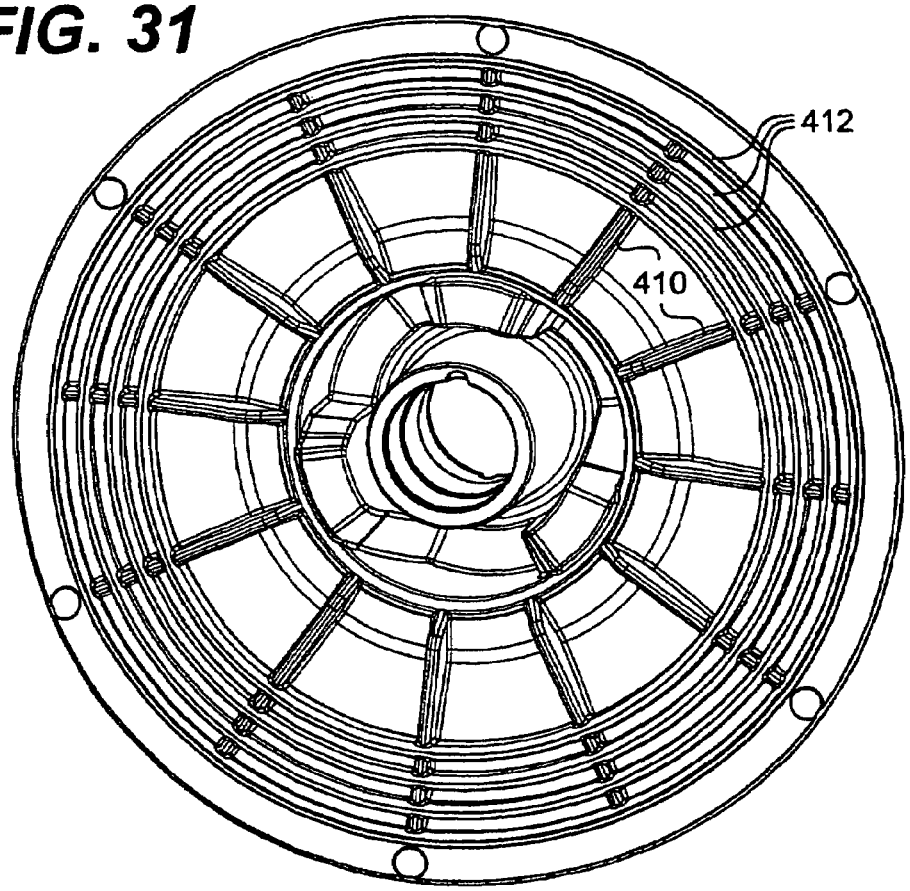
FIG. 31 is a rear view illustration of the inner half of the driven pulley of the CVT of the present invention.

During RTT operation of the CVT 26, the RTT ramps engage corresponding surfaces on the interior of the inner half of the driven pulley 324, which are illustrated in FIG. 31. The gearing characteristics of the guide member 388 may be determined by the shape and slope of the corresponding ramps 396, 398.

The guide member 388 preferably is made of a synthetic material. Besides providing a light-weight construction, a synthetic material also offers a great acoustic advantage since the noise development at the onset of driving, when the two ramps collide, is greatly reduced as compared to other materials. Preferably, the guide member 388 is made from fiberglass. For example, it is contemplated that the guide member 388 may be constructed from a carbon fiber material. Of course, as would be appreciated by those skilled in the art, other materials may be selected therefor without deviating from the scope of the present invention.

Figure 29:
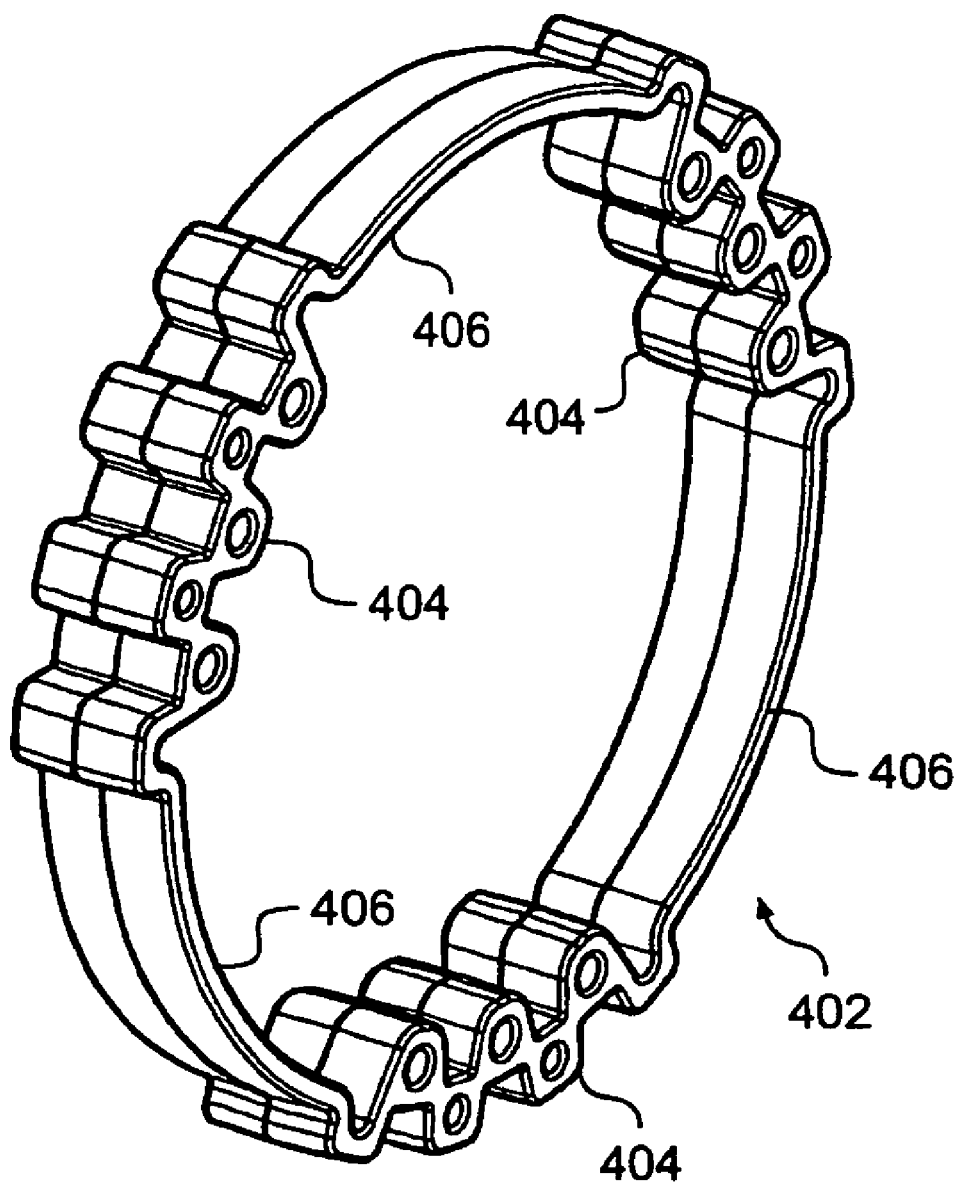
FIG. 29 is a perspective illustration of the connector of the driven pulley of the CAT of the present invention.
Figure 30:
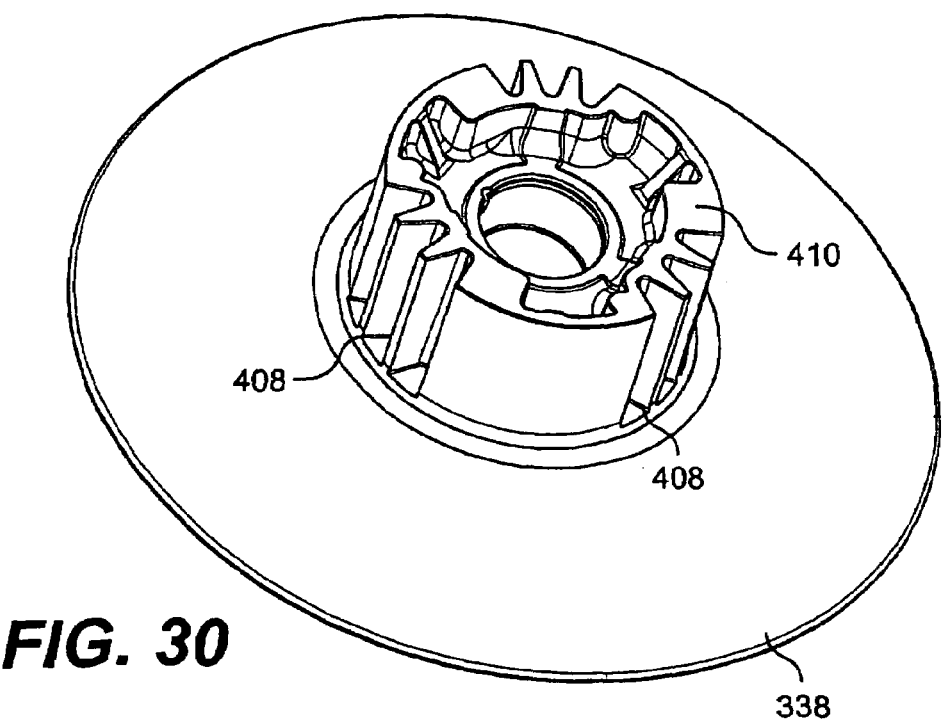
FIG. 30 is a perspective illustration of the inner half of the driven pulley of the CVT of the present invention.

The outer half 330 of the driven pulley 324 is operationally coupled to the inner half 328 through a connector 402, which is illustrated in greater detail in FIG. 29. The connector, which is preferably made of a material that is at least 2% teflon® (polytetrafluoroethylene), includes ribbed sections 404 connected by non-ribbed sections 406. The ribbed sections 406 engage similarly-shaped indentations 408 on the hub 410 of the inner half 328 of the driven pulley 324, as shown in FIG. 30. While not shown, the ribbed sections 404 also engage similar indentations on the outer half 330 of the driven pulley 324.

The outer and inner halves 330, 328 of the driven pulley 324 are journaled on the pulley shaft 401 by both slide bearings 403 and ball bearings 405. Thus, they are not rigidly coupled to the shaft 401. The transmission of torque from the pulley shaft 401 to the driven pulley 324 is accomplished solely by the guide member 388 and its associated ramps 396, 398. In contrast to CVT constructions known in the prior art, where the outer half of the driven pulley is rigidly fixed to the driven pulley shaft, the outer half 330 and the pulley shaft 401 in the CVT 26 of the present invention are decoupled. The decoupling of these two elements eliminates or at least greatly reduces torsional vibrations which are otherwise caused by the inertia of the outer half of the driven pulley. Furthermore, the connector 402 prevents relative movement between the inner and outer halves 328, 330 of the driven pulley 324, which reduces considerably slip and friction between the belt 332 and the pulley halves 328, 330.

As illustrated in FIG. 31, the inner surface of the inner half 328 of the driven pulley 324 includes radial ribs 410 and circumferential ribs 412. These ribs 410, 412 increase to structural strength of the half 328 to prevent micro-cracks from forming during operation.

Figure 32:
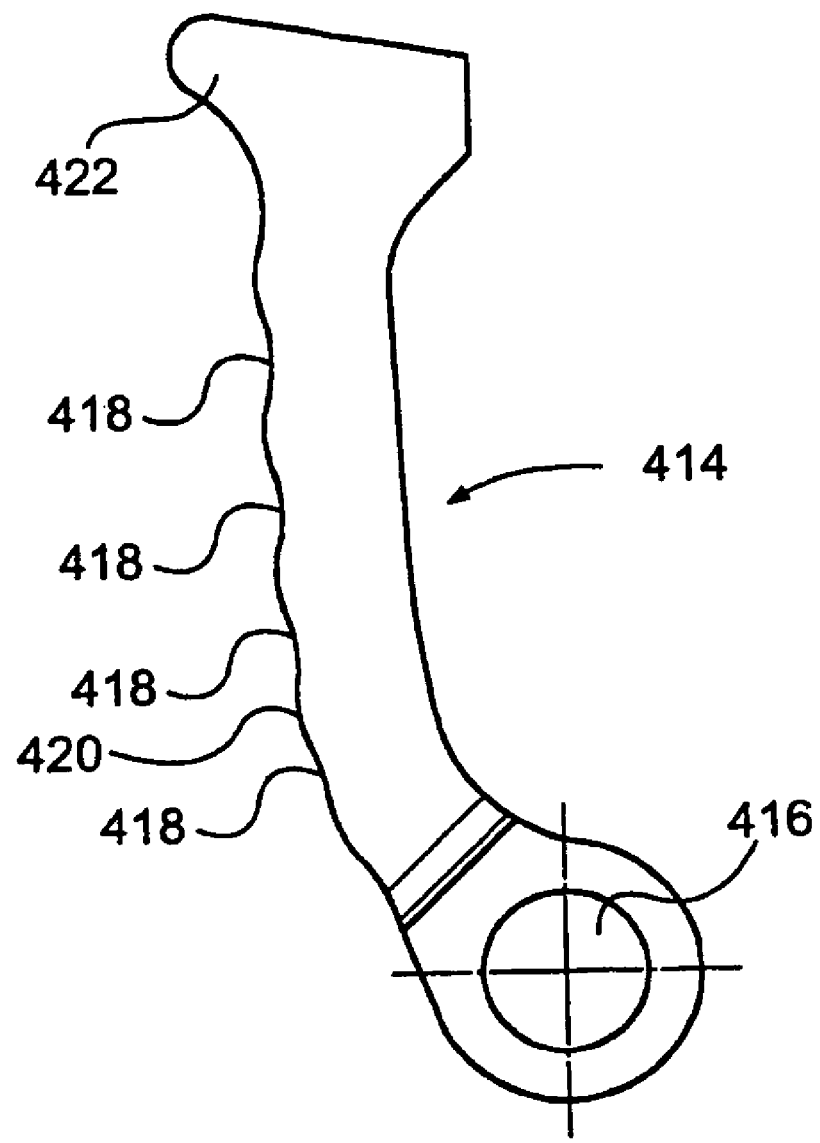
FIG. 32 is an enlarged, top view illustration of an alternate embodiment one of the centrifugal weights pivotally attached to the outer half of the driven half of the CVT of the present invention.

FIG. 32 illustrates on alternative embodiment of the centrifugal weights 344. In FIG. 32, a centrifugal weight 414 is illustrated. The centrifugal weight 414 includes a hole 416 at one end that may be pivotally connected to the drive pulley roller member 354. The centrifugal weight 414 is essentially the same as the centrifugal weight 344, except that the centrifgual weight 414 includes a plurality of indentations 418 along its outer surface 420, inward from the stop 422. The indentations 418 are designed to delay the advancement of the centrifugal weights 414 as they pivot outwardly against the rollers 352. When provided with the indentations 418, the centrifugal weights 414 behave such that the operator feels like the ATV 16 is changing gears, like a conventionally-geared ATV.

Specifically, the wave-type geometry on the outer surfaces 420 of the centrifugal weights 414 defines the indentations 418. The rollers 352 will come to rest in one of the wave indentations 418 only within a certain range of engine speeds. Only when a certain engine speed limit is exceeded will the rollers 352 advance to the next indentation 418, thus, progressing in a step-wise fashion to simulate changes from a lower gear to a higher one.

Alternatively, while specific outer surfaces 350, 420 are illustrated for the centrifugal weights 344, 414, there are many alternative shapes that may be applied. It is expected that different shapes will influence the operation of the CVT 26 to change the operational characteristics of the ATV 16. Specifically, the geometry of the outer surface 350, 420 conceivably could offer more/less aggressive operational characteristics for the ATV 16. In addition, the centrifugal weights 344, 414 do not all need to be the same shape. It is envisioned that weights 344, 414 of differing shapes could be positioned about the periphery of the drive gear 322 to alter or control the operational characteristics of the ATV 16.

Figure 33:
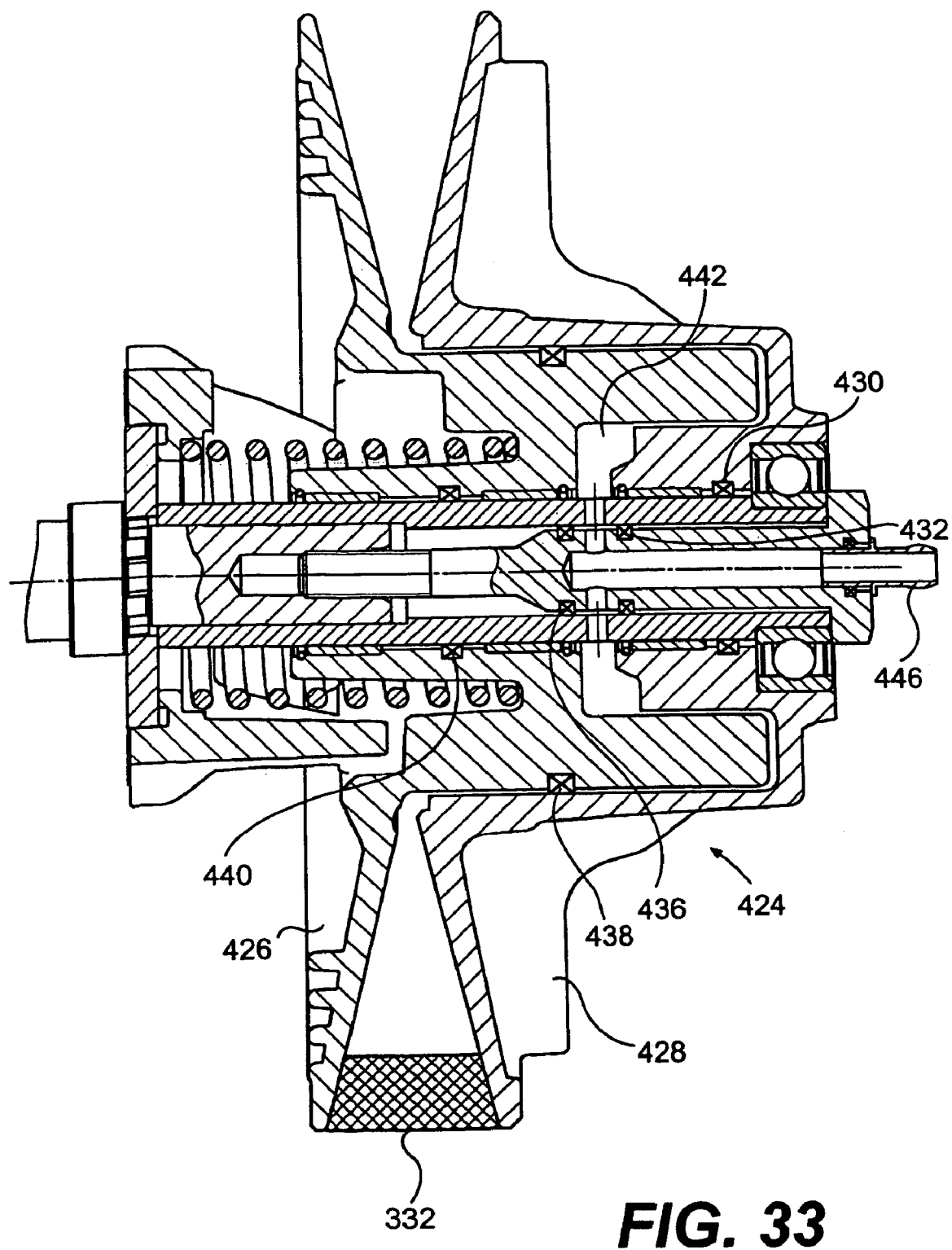
FIG. 33 is a cross-sectional side view illustration of an alternative driven pulley for the CVT of the present invention, showing the construction for a pneumatically-operated driven pulley.

FIG. 33 illustrates an alternative embodiment of a driven pulley, a pneumatically-actuated driven pulley 424. In the pneumatic driven pulley 424, movement between the inner half 426 and the outer half 428 of the pulley 424 is actuated pneumatically, preferably with vacuum pressure from the crankcase 74 of the engine 10. In this embodiment, guide member 388 may be eliminated altogether. Alternatively, guide member 388 may be provided, so that the driven pulley 424 may continue to operate even upon loss of pneumatic control.

So that the pneumatically driven pulley 424 may operate, a number of seals 430, 432, 434, 436, 438, 440 are provided between the inner half 426 and the outer half 428. The application of vacuum to the inner chamber 442 via the vacuum connector 446 draws the two halves 426, 428 together to provide a tight clamping force on the belt 332 positioned therebetween. The vacuum can be supplied by a pneumatic coupling (not shown) mounted to the CVT cover 28 that allows vacuum to be selectively supplied from the engine 10 (or other vacuum source, such as a vacuum pump) to chamber 442 via connector 446.

It is expected that this type of driven pulley 424 should be especially effective for providing engine braking to the ATV 16. In particular, upon deceleration of the engine 10, the throttle will be closed, resulting in a high vacuum in the engine 10, which will provide a strong clamping force between the two halves 426, 428. As a result, the belt 332 will be clamped more tightly between the pulley halves 426, 428 as compared with other driven gears for CVTs. This means that engine braking may be applied effectively from the engine 10 to the vehicle 16. Alternatively, a pressure chamber could be positioned on the opposite side of pulley half 426 such that a pressure source (rather than a vacuum source) could be used to clamp the pulley halves 426, 428 together. Furthermore, it is contemplated that a vacuum valve may be provided to control vacuum pressure. If provided, it is contemplated that the vacuum valve could be a solenoid whose operation is controlled by the electronic control unit (or "ECU") of the engine 10.

11. The Gear Shift

FIGS. 7 and 34–38 illustrate a further feature of the engine 10 of the present invention, a gear shift mechanism 448, which provides a three-step gear shift. The gear shift 448 includes a toothed wheel gear 450 having five possible positions: high, low, neutral, reverse and parking. Via a selector shaft 452, which is non-rotationally connected to the toothed gear 450, transmission of the gear positions to a control shaft 454 is effected.

As illustrated in FIG. 37, the surface of the control shaft 454 includes two grooves 456, 458. The grooves correspond to toothed wheels 460, 462, depending upon the position (i.e. rotation) of the control shaft 454, which is selected via selector forks 91, 93 to move into the correct position.

Figure 38:
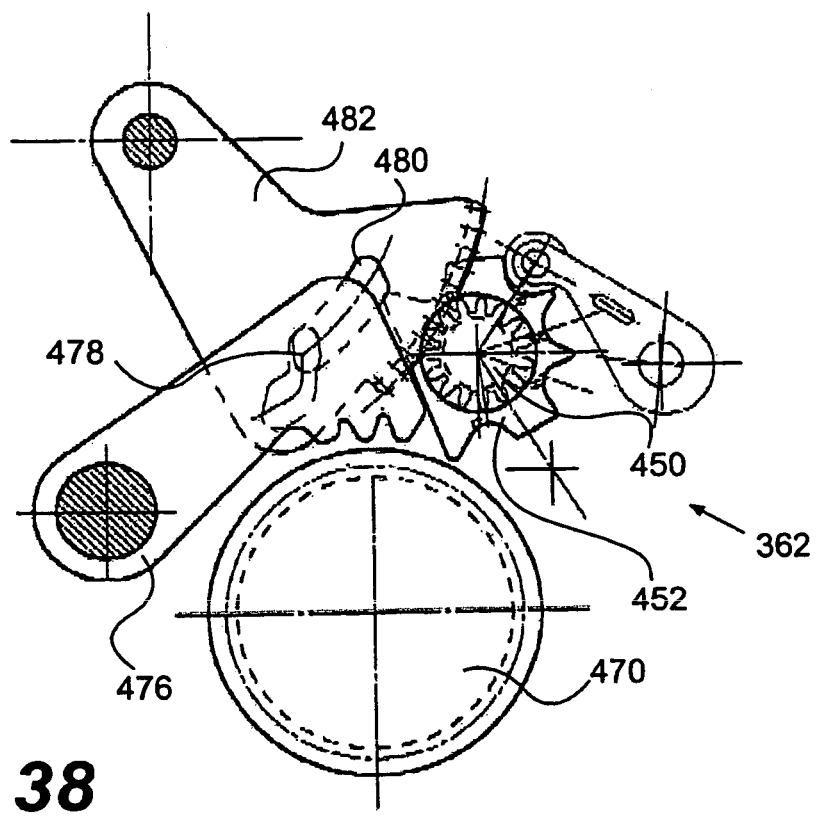
FIG. 38 is an enlarged portion of the gearing mechanism of the present invention, shown in a non-parked mode.
Figure 39:
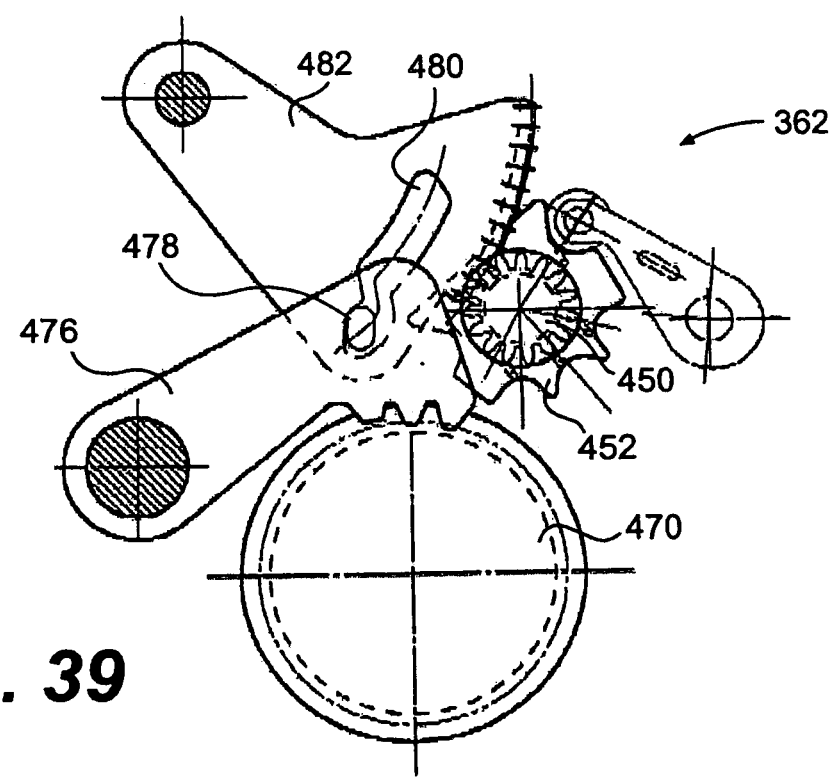
FIG. 39 is an enlarged portion of the gearing mechanism of the present invention, shown in a parked mode.

In the "low" position, the selector fork 464 and the corresponding gear toothed wheel 462 are positioned on the left-hand side of the input shaft. Te toothed wheel 470 is displaced with the selector fork 466 towards the left-hand side on the driven shaft to effect a non-rotational connection with the toothed wheel 468. In the "high" position, the left-hand selecting fork 464 is displaced towards the right. As a result, the toothed wheel 460 is displaced toward the right so that it non-rotationally engages with a toothed wheel 462, which meshes with the toothed wheel 470 on the output shaft. In the "reverse" position, the right-hand selecting fork 466 and the toothed wheel 470 are displaced on the output shaft towards the right-hand side. Accordingly, toothed wheel 472 effects a meshing engagement with toothed wheel 474. In the "parking" position, the two selector forks 464, 466 remain in the same position as in the "neutral" position. However, a fork 476 with a three-toothed segment, which is forcibly guided via a fork pin 478 engaged with a groove 480 on the toothed segment 482, is pivoted towards the gear 470. FIGS. 38 and 39 are illustrative of this operation. In particular, FIG. 38 shows the fork 476 disengaged from the gear 470 when the vehicle is not parked. FIG. 39 shows the fork 476 engaged with the gear 470 in the park position to lock the gear 470 and prevent movement of the vehicle. The teeth on the fork 476 and the teeth on the gear 470 preferably are self-locking, as would be understood by those skilled in the art.

Three sensors are provided to detect the position of the control shaft 454. Between the control shaft 454 and the sensors, an index disk 484 is interposed, which interacts with the index lever. The index disk 484 and enables an exact positioning of the selector forks 464, 466 by permitting them to mesh with the appropriate position on the selector shaft 452. The index disk 484 also enables identification of the positions "neutral," "reverse," and "parking" via an electric connection to ground.

12. The Timing Chain Tensioner

As illustrated in FIG. 4, the timing control chain 54 is provided with a mechanical timing chain tensioner 486, which is positioned in the cylinder block 132. While a mechanical timing chain tensioner 486 is preferred, the tensioner 486 alternatively could be hydraulically or electrically controlled, as would be understood by those skilled in the art.

13. The Control Device

The engine 10 is equipped with a combined battery/magneto ignition (not shown). The advantages of this installation is that the engine 10 is expected to operate even if the battery fails. The ignition includes a 400 W generator, which is provided with a start/stop switch.

For engine speed measurement and ignition timing, a sensor is attached to the magnet wheel 42. Furthermore, vehicle speed measurement is provided by a Hall sensor on the bevel wheel gear. In addition, an engine speed delimiter is provided. A delimiter is provided, which can be programmed to a maximum speed of 15–20 km/h (return gear) and 0–139 km/h (forward gear).

Attempts are made to obtain as "soft" a revolution delimitation as possible via a sparking angle control (sparking instant control). The sparking angle control is effected via a programable ignition time angle control. This can be supplemented with the optional omission of ingitions. The throttle position in the carburettor (suction carburettor with throttle flap flat slide for the nozzle needle) may be monitored via a further sensor. Finally, an oil pressure control is provided which triggers the engine speed delimiter or even causes the omission of ignitions when the oil pressure falls under a critical level (≈0.3–0.6 atm).

14. The ATV Layout

The disposition of the engine 10 on the frame 17 of the ATV 16 is also an aspect of the present invention. The particular arrangement of the engine 10 on the frame 17 is illustrated in FIG. 3.

In the present invention, the engine 10 is positioned on the frame 17 of the ATV 16 such that the cylinder 34 is located at the rear of the engine 10. As such, the CVT 26 preferably is disposed on the left side of the ATV 16, the right and left sides of the ATV 16 being defined by the ATV's forward travel direction. With this positioning, the output shaft 30 of the engine 10 preferably is disposed on the right side of the centerline 488 of the ATV 16. In addition, with the engine 10 positioned on the frame in this manner, the crankshaft 12 and drive pulley shaft 374 are positioned behind the driven pulley shaft 401.

The centerline 14 of the engine 10, which is defined by the axis of the cylinder 34, preferably is disposed distance b from the centerline 488 of the ATV 16, as illustrated in FIG. 3. With this arrangement, the centerline 490 of the CVT 26, which is defined by the line along which the belt 332 travels between the drive pulley 322 and the driven pulley 324, is disposed distance d from the centerline 488 of the CVT. As indicated above, the centerline 14 of the engine 10 and the centerline 490 of the CVT 26 are both disposed on the left side of the centerline 488 of the ATV 16. The centerline 492 of the output shaft 30 preferably is disposed distance c from the centerline 488 toward the right side of the ATV 16. As indicated in FIG. 3, the centerline 488 of the ATV 16 is defined such that the distance from the centerline 488 to the front wheels is measured by substantially the same distance a.

With this arrangement, the output shaft 30 is arranged on one side of the centerline 488 of the ATV 16 while the centerline 14 of the engine 10 and the centerline 490 of the CVT 26 are arranged on the other side. This provides for a more balanced positioning of the engine 10 on the frame 17 of the ATV 16 of the present invention. As mentioned above, however, the engine 10 may be reversed in it orientation on the frame 17 of the ATV 16. If so, the relationship between the various components of the engine 10 and ATV 16 will remain the same but the orientation will, naturally, be opposite to that described above.

While the preferred embodiments of the present invention have been described above, the present invention is not meant to be limited solely to those embodiments. Instead, the present invention is meant to encompass any and all equivalents to the embodiments described above, to the extent consistent with the forwgoing description and the appended claims.

What is claimed is:

1. An all terrain vehicle, comprising:
    a frame having a rear and a front side;
    a straddle seat disposed on the frame;
    at least two wheel axes disposed on the frame;
    a plurality of wheels disposed on the at least two wheel axes;
    a handlebar disposed on the frame and operatively connected to at least one of the wheels;
    an engine disposed on the frame, the engine including a cylinder disposed adjacent a crankshaft and a generator operatively connected to the crankshaft; and
    an output shaft, separate from the crankshaft, operatively connected to the engine to transmit power from the engine to at least one of the plurality of wheels through at least one of the wheel axes;
    wherein the output shaft is disposed between the cylinder and the generator in a plane substantially perpendicular to at least one of the wheel axes.

2. The all terrain vehicle of claim 1, further comprising:
    a continuously variable transmission operatively connected between the engine and the output shaft,
    wherein the cylinder is positioned between the output shaft and the continuously variable transmission.

3. The all terrain vehicle of claim 2, wherein the continuously variable transmission further comprises:
    a drive pulley operatively connected to the crankshaft;
    a driven pulley operatively connected to the output shaft; and
    a belt operatively connecting the drive pulley to the driven pulley,
    wherein the cylinder is positioned between the output shaft and the belt.

4. The all terrain vehicle of claim 1, wherein: the cylinder is disposed at the rear side of the frame.

5. The all terrain vehicle of claim 2, wherein: the cylinder is disposed at the rear side of the frame.

6. The all terrain vehicle of claim 3, wherein: the cylinder is disposed at the rear side of the frame.

7. The all terrain vehicle of claim 1, wherein the crankshaft is oriented generally perpendicular to the output shaft.

8. The all terrain vehicle of claim 1, wherein the output shaft connects the engine to at least two of the at least two wheel axes.

9. The all terrain vehicle of claim 1, wherein the generator includes a magnet wheel and at least one stationary coil.

10. The all terrain vehicle of claim 9, wherein the magnet wheel is connected with the crankshaft as to rotate in unison with the crankshaft.

11. A vehicle, comprising:
    a frame having a rear and a front side;
    at least two wheel axes disposed on the frame;
    a plurality of wheels disposed on the at least two wheel axes;
    an engine disposed on the frame, the engine including a cylinder and a crankshaft;
    a transmission operatively connected to the engine, the transmission including a transmission output shaft;
    a vehicle output shaft operatively connected to the engine via the transmission output shaft to transmit power from the engine to at least one of the plurality of wheels through at least one of the wheel axes;

the vehicle output shaft being disposed in a plane substantially perpendicular to at least one of the wheel axes; and the transmission output shaft having a bevel gear formed together therewith in a one-piece construction, the bevel gear intermeshing with a gear on the vehicle output shaft.

12. The vehicle of claim 11, wherein the transmission output shaft is supported by a first and a second bearing; the first bearing being disposed on one side of the transmission output shaft with respect to the bevel gear; and the second bearing being disposed on the other side of the transmission output shaft with respect to the bevel gear.

13. The vehicle of claim 11, wherein the vehicle is an all-terrain vehicle further comprising: a straddle seat disposed on the frame; a handlebar disposed on the frame and operatively connected to at least one of the wheels.

14. The vehicle of claim 12, wherein the vehicle is an all-terrain vehicle further comprising: a straddle seat disposed on the frame; a handlebar disposed on the frame and operatively connected to at least one of the wheels.

15. The vehicle of claim 12, wherein the vehicle output shaft has a vehicle output shaft axis, the vehicle output shaft being operatively supported by the frame so as to rotate about the vehicle output shaft axis, and wherein the first bearing is disposed between the vehicle output shaft axis and the bevel gear.

16. The vehicle of claim 12, further comprising: a generator operatively connected to the crankshaft, wherein the vehicle output shaft is disposed between the cylinder and the generator in a plane substantially perpendicular to at least one of the wheel axes.

17. The vehicle of claim 12, further comprising: a continuously variable transmission operatively connected between the engine and the vehicle output shaft, wherein the cylinder is positioned between the vehicle output shaft and the continuously variable transmission.

18. The vehicle of claim 17, wherein the continuously variable transmission further comprises: a drive pulley operatively connected to the crankshaft; a driven pulley operatively connected to the vehicle output shaft; and a belt operatively connecting the drive pulley to the driven pulley, wherein the cylinder is positioned between the vehicle output shaft and the belt.

19. The vehicle of claim 12, wherein: the cylinder is disposed at the rear side of the frame.

20. A vehicle, comprising:
a frame having a rear and a front side;
at least two wheel axes disposed on the frame;
a plurality of wheels disposed on the at least two wheel axes;
an engine disposed on the frame, the engine including a cylinder and a crankshaft;
a transmission operatively connected to the engine;
the transmission including a transmission output shaft having a first end and a second end;
the transmission output shaft carrying a bevel gear between the first end and the second end;
a vehicle output shaft operatively connected to the engine via the transmission output shaft to transmit power from the engine to at least one of the plurality of wheels through at least one of the wheel axes;
the vehicle output shaft being disposed in a plane substantially perpendicular to at least one of the wheel axes;
the transmission output shaft being journaled by a first and a second bearing;
the first bearing being disposed between the first end of the transmission output shaft and the bevel gear;
and the second bearing being disposed between the second end of the transmission output shaft and the bevel gear.

21. The vehicle of claim 20, wherein the bevel gear is connected to the vehicle output shaft and is integral with the transmission output shaft.

22. The vehicle of claim 20, wherein the vehicle is an all-terrain vehicle further comprising: a straddle seat disposed on the frame; a handlebar disposed on the frame and operatively connected to at least one of the wheels.

23. The vehicle of claim 21, wherein the vehicle is an all-terrain vehicle further comprising: a straddle seat disposed on the frame; a handlebar disposed on the frame and operatively connected to at least one of the wheels.

24. The vehicle of claim 20, wherein the vehicle output shaft has a vehicle output shaft axis, the vehicle output shaft being operatively supported by the frame to rotate about the vehicle output shaft axis, and the first bearing being disposed between the vehicle output shaft axis and the bevel gear.

25. The vehicle of claim 20, further comprising: a generator operatively connected to the crankshaft, wherein the vehicle output shaft is disposed between the cylinder and the generator in a plane substantially perpendicular to at least one of the wheel axes.

26. The vehicle of claim 20, further comprising: a continuously variable transmission operatively connected between the engine and the vehicle output shaft, wherein the cylinder is positioned between the vehicle output shaft and the continuously variable transmission.

27. The vehicle of claim 26, wherein the continuously variable transmission further comprises: a drive pulley operatively connected to the crankshaft; a driven pulley operatively connected to the output shaft; and a belt operatively connecting the drive pulley to the driven pulley, wherein the cylinder is positioned between the output shaft and the belt.

28. The vehicle of claim 20, wherein: the cylinder is disposed at the rear side of the frame.

* * * * *